US012624151B2

(12) United States Patent
Kawai

(10) Patent No.: US 12,624,151 B2
(45) Date of Patent: May 12, 2026

(54) POLYCARBONATE POLYOL COMPOSITION

(71) Applicant: ASAHI KASEI KABUSHIKI KAISHA, Tokyo (JP)

(72) Inventor: Yasufumi Kawai, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 17/802,319

(22) PCT Filed: Oct. 1, 2021

(86) PCT No.: PCT/JP2021/036481
§ 371 (c)(1),
(2) Date: Aug. 25, 2022

(87) PCT Pub. No.: WO2022/075225
PCT Pub. Date: Apr. 14, 2022

(65) Prior Publication Data

US 2023/0227598 A1 Jul. 20, 2023

(30) Foreign Application Priority Data

Oct. 9, 2020 (JP) ................................ 2020-171511

(51) Int. Cl.
*C08G 18/44* (2006.01)
*C08G 64/16* (2006.01)
*C09D 175/04* (2006.01)

(52) U.S. Cl.
CPC ......... *C08G 18/44* (2013.01); *C08G 64/1691* (2013.01); *C09D 175/04* (2013.01)

(58) Field of Classification Search
CPC ... C08G 18/44; C08G 64/1691; C09D 175/04
USPC .......................................................... 524/591
See application file for complete search history.

(56) References Cited

U.S. PATENT DOCUMENTS

| | | | |
|---|---|---|---|
| 2003/0176622 A1 | 9/2003 | Konishi et al. |
| 2010/0239846 A1 | 9/2010 | Tsubota |
| 2010/0261852 A1 | 10/2010 | Masubuchi et al. |
| 2013/0302624 A1 | 11/2013 | Münzmay |
| 2014/0212676 A1 | 7/2014 | Tetsui et al. |
| 2021/0163738 A1 | 6/2021 | Higuchi et al. |

FOREIGN PATENT DOCUMENTS

| | | | | |
|---|---|---|---|---|
| CN | 103347916 | A | | 10/2013 |
| JP | 2010-229267 | A | | 10/2010 |
| JP | 2014-62202 | A | | 4/2014 |
| JP | 2014-105250 | A | | 6/2014 |
| JP | 2014-218568 | A | | 11/2014 |
| JP | 2015-214599 | A | | 12/2015 |
| JP | 2017-48304 | A | | 3/2017 |
| JP | 2017-48320 | A | | 3/2017 |
| JP | 2017-114924 | A | | 6/2017 |
| JP | 2018-21151 | A | | 2/2018 |
| JP | 2018021151 | A | * | 2/2018 |
| JP | 2018-53122 | A | | 4/2018 |
| JP | 2020-84104 | A | | 6/2020 |
| WO | 2001/90213 | A1 | | 11/2001 |
| WO | 2009/063767 | A1 | | 5/2009 |
| WO | 2013/027489 | A1 | | 2/2013 |
| WO | 2019/093219 | A1 | | 5/2019 |
| WO | 2020/213747 | A1 | | 10/2020 |

OTHER PUBLICATIONS

Translation of JP-2018021151-A (Horiguchi et al., Ultraviolet absorber-resistant polyurethane composition, and coating material prepared with the composition) (Year: 2018).*
Supplementary European Search Report issued in European Patent Application No. 21877524.5 dated Feb. 9, 2024.
International Search Report issued in International Patent Application No. PCT/JP2021/036481, dated Dec. 21, 2021, along with an English translation thereof.

(Continued)

*Primary Examiner* — Arrie L Reuther
*Assistant Examiner* — Doris Ling
(74) *Attorney, Agent, or Firm* — Greenblum & Bernstein, P.L.C.

(57) ABSTRACT

Provided is a polycarbonate polyol composition including an unmodified polycarbonate polyol having a carbonate structure represented by the following formula (A), and a modified polycarbonate polyol having a carbonate structure represented by the following formula (A) and a urethane structure represented by the following formula (B), wherein 90% by mol or more of the total quantity of terminal groups of all the compounds in the composition is hydroxy groups, and the number of functional groups calculated according to the following expression (II) is 2.00 to 10.00:

$$\text{The number of functional groups} = Mn \times OHV/56.11/1000 \quad \text{(II)}$$

(A)

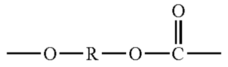

(B)

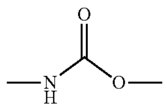

18 Claims, No Drawings

(56) References Cited

OTHER PUBLICATIONS

International Preliminary Report on Patentability issued in International Patent Application No. PCT/JP2021/036481, dated Mar. 28, 2023, along with an English translation thereof.
Dong Yanming et al., Structure and Properties of Polymer, Shanghai East China University of Science and Technology Press, 2010, p. 126.

* cited by examiner

POLYCARBONATE POLYOL COMPOSITION

TECHNICAL FIELD

The present invention relates to a polycarbonate polyol composition.

BACKGROUND ART

Polyurethane resins have heretofore been used in a wide range of fields such as synthetic leather, artificial leather, adhesives, coating materials for furniture, and coating materials for automobiles. Of starting materials of the polyurethane resins, polyether, polyester, and polycarbonate are used as polyol components to be reacted with isocyanate. However, in recent years, there has been a growing demand for the resistance, such as heat resistance, weather resistance, hydrolysis resistance, solvent resistance, sunscreen resistance, or scratch resistance, of polyurethane resins.

In general, a polyurethane resin obtained using polycarbonate polyol as a polyol component is known to be superior in moist heat resistance, solvent resistance, sunscreen resistance, scratch resistance, etc. to a polyurethane resin obtained using polyether or polyester. For example, Patent Document 1 discloses a polycarbonate polyol obtained using 1,5-pentanediol and 1,6-hexanediol as diol components. For example, Patent Document 2 discloses a polycarbonate polyol obtained using 1,4-butanediol and 1,6-hexanediol. For example, Patent Document 3 discloses an ultraviolet absorber-resistant polyurethane composition comprising a polyisocyanate (A), an amino alcohol (B), and a polyol (C) as monomer units, and comprising a hydroxy group-terminated prepolymer having an isocyanurate ring structure, and a curing agent. For example, Patent Document 4 discloses a leather-like sheet comprising a skin layer (C), an adhesive layer (D), and a support layer (E), the skin layer (C) being formed using a urethane resin composition containing a urethane resin (A) having two or more hydroxy groups at least one end, and an aqueous medium (B).

LIST OF PRIOR ART DOCUMENTS

Patent Document

Patent Document 1: International Publication No. WO 2001/090213
Patent Document 2: International Publication No. WO 2009/063767
Patent Document 3: Japanese Patent Laid-Open No. 2017-048320
Patent Document 4: International Publication No. WO 2013/027489

SUMMARY OF INVENTION

Problems to be Solved by Invention

However, for example, a coating material composition obtained using a polycarbonate polyol as a polyol component requires a more time for drying than that of a coating material composition obtained using polyether or polyester as a polyol component, and tends to increase a drying step. Also, a polyurethane obtained using a polycarbonate polyol as a polyol component may not meet endurance which has been a requirement expected for polyurethane resins in recent years. Neither Patent Document 1 nor 2 described above mentions the drying properties of a prepared coating material composition. Thus, the techniques disclosed therein are still susceptible to improvement.

In general, a polyol having a urethane group is used with an organic solvent having a high solvency, for example, dimethylformamide or methyl ethyl ketone. However, use of the solvents such as carcinogenic dimethylformamide or the deleterious substance methyl ethyl ketone is avoided from the viewpoint of preventing health problems. There is a demand for their substitution by dipropylene glycol monomethyl ether (hereinafter, also abbreviated to "DPM"), etc. which does not correspond to a carcinogen, a toxic substance or a deleterious substance. Neither Patent Document 3 nor 4 described above mentions the solubility of a polycarbonate polyol having a urethane group in DPM, etc. Thus, the techniques disclosed therein are still susceptible to improvement.

Accordingly, an object of the present invention is to provide a polycarbonate polyol composition that is excellent in compatibility with DPM and is capable of forming a coating material composition excellent in drying properties and a coating film and/or a polyurethane film excellent in endurance.

Means for Solving Problems

The present inventor has conducted diligent studies to attain the object and consequently completed the present invention by finding that a polycarbonate polyol composition having a specific structure and specific physical properties is excellent in compatibility with DPM and is capable of forming a coating material composition excellent in drying properties and a coating film and/or a polyurethane film excellent in endurance.

Specifically, the present invention is configured as follows.

[1]

A polycarbonate polyol composition comprising an unmodified polycarbonate polyol having a carbonate structure represented by the following formula (A), and a modified polycarbonate polyol having a carbonate structure represented by the following formula (A) and a urethane structure represented by the following formula (B), wherein 90% by mol or more of the total quantity of terminal groups of all the compounds in the composition is hydroxy groups, and the number of functional groups calculated according to the following expression (II) is 2.00 to 10.00:

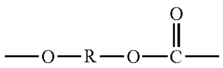

(A)

wherein R represents a divalent linear, branched or cyclic aliphatic hydrocarbon group optionally containing a heteroatom, or a divalent aromatic hydrocarbon group optionally containing a heteroatom,

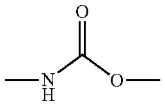

(B)

$$\text{the number of functional groups} = Mn \times OHV/56.11/1000 \quad \text{(II)}$$

wherein Mn represents a number-average molecular weight of the polycarbonate polyol composition determined by GPC measurement, and OHV represents a hydroxy value of the polycarbonate polyol composition.

[2]

The polycarbonate polyol composition according to [1], wherein the hydroxy value is 5 to 700 mg-KOH/g.

[3]

The polycarbonate polyol composition according to [1] or [2], wherein APHA is 100 or less.

[4]

The polycarbonate polyol composition according to any of [1] to [3], wherein in infrared absorption spectrum absorbance measured by FT-IR, when a height of an infrared absorption spectrum absorbance (Abs) peak around a wavenumber of 1743 $cm^{-1}$ derived mainly from the carbonate structure represented by the formula (A) is defined as PA and when a height of an infrared absorption spectrum absorbance (Abs) peak around a wavenumber of 1691 $cm^{-1}$ derived mainly from the urethane structure represented by the formula (B) is defined as PB, a value of PB/PA is 0.05 to 1.00.

[5]

The polycarbonate polyol composition according to any of [1] to [4], wherein in infrared absorption spectrum absorbance measured by FT-IR, when a height of an infrared absorption spectrum absorbance (Abs) peak around a wavenumber of 1691 $cm^{-1}$ derived mainly from the urethane structure represented by the formula (B) is defined as PB and when a height of an infrared absorption spectrum absorbance (Abs) peak around a wavenumber of 3000 to 3800 $cm^{-1}$ derived mainly from a hydroxy group is defined as POH, a value of PB/POH is 1.00 to 5.00.

[6]

The polycarbonate polyol composition according to any of [1] to [5], wherein the modified polycarbonate polyol comprises a cyclic structure.

[7]

The polycarbonate polyol composition according to [6], wherein the cyclic structure is an isocyanurate ring.

[8]

The polycarbonate polyol composition according to any of [1] to [7], wherein the unmodified polycarbonate polyol and/or the modified polycarbonate polyol comprises a hydrophilic structure.

[9]

The polycarbonate polyol composition according to [8], wherein the hydrophilic structure is a nonionic hydrophilic group.

[10]

The polycarbonate polyol composition according to [8], wherein the hydrophilic structure is an anionic hydrophilic group.

[11]

The polycarbonate polyol composition according to any of [8] to [10], wherein the composition is capable of being dispersed in water.

[12]

A coating material comprising the polycarbonate polyol composition according to any of [1] to [11].

[13]

The coating material according to [12], wherein the coating material is an aqueous coating material.

[14]

A coating agent comprising the polycarbonate polyol composition according to any of [1] to [11].

[15]

The coating agent according to [14], wherein the coating agent is an aqueous coating agent.

[16]

A polyurethane obtained using the polycarbonate polyol composition according to any of [1] to [11].

[17]

An aqueous polyurethane obtained using the polycarbonate polyol composition according to any of [1] to [11].

[18]

An artificial leather obtained using the polyurethane according to [16] or the aqueous polyurethane according to [17].

[19]

A synthetic leather obtained using the polyurethane according to [16] or the aqueous polyurethane according to [17].

[20]

A coating material obtained using the polyurethane according to [16] or the aqueous polyurethane according to [17].

[21]

A coating agent obtained using the polyurethane according to [16] or the aqueous polyurethane according to [17].

[22]

A coating film obtained from the coating material according to any of [12], [13] and [20] or the coating agent according to any of [14], [15] and [21].

[23]

A film obtained from the coating material according to any of [12], [13] and [20] or the coating agent according to any of [14], [15] and [21].

Advantages of Invention

The present invention can provide a polycarbonate polyol composition that is excellent in compatibility with DPM and is capable of forming a coating material composition excellent in drying properties and a coating film and/or a polyurethane film excellent in endurance.

Mode for Carrying Out Invention

Hereinafter, the mode for carrying out the present invention (hereinafter, referred to as the "present embodiment") will be described in detail. The present invention is not limited by the description below and can be carried out with various modification or changes made therein without departing from the spirit of the present invention.

[Polycarbonate Polyol Composition]

The polycarbonate polyol composition of the present embodiment comprises an unmodified polycarbonate polyol having a carbonate structure represented by the following formula (A), and a modified polycarbonate polyol having a carbonate structure represented by the following formula (A) and a urethane structure represented by the following formula (B), wherein 90% by mol or more of the total quantity of terminal groups of all the compounds in the composition is hydroxy groups, and the number of functional groups calculated according to the following expression (II) is 2.00 to 10.00:

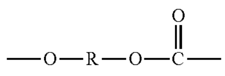

(A)

wherein R represents a divalent linear, branched or cyclic aliphatic hydrocarbon group optionally containing a heteroatom, or a divalent aromatic hydrocarbon group optionally containing a heteroatom, (B)

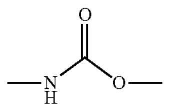

$$\text{the number of functional groups}=\text{Mn}\times\text{OHV}/56.11/1000 \quad \text{(II)}$$

wherein Mn represents a number-average molecular weight of the polycarbonate polyol composition determined by GPC measurement, and OHV represents a hydroxy value of the polycarbonate polyol composition.

The polycarbonate polyol composition of the present embodiment is excellent in compatibility with DPM and can form a coating material composition excellent in drying properties and a coating film and/or a polyurethane film excellent in endurance, by comprising an unmodified polycarbonate polyol having a carbonate structure represented by the formula (A), and a modified polycarbonate polyol having a carbonate structure represented by the formula (A) and a urethane structure represented by the formula (B), wherein 90% by mol or more of the total quantity of terminal groups of all the compounds in the composition is hydroxy groups, and the number of functional groups calculated according to the expression (II) is 2.00 to 10.00.

The polycarbonate polyol composition of the present embodiment contains an unmodified polycarbonate polyol.

The unmodified polycarbonate polyol contained in the polycarbonate polyol composition of the present embodiment decreases the viscosity of the polycarbonate polyol composition and decreases the amount of a solvent. The resulting polycarbonate polyol composition tends to achieve prevention of health problems and environmental conservation, and tends to be excellent in compatibility with DPM.

Examples of the method for analyzing the unmodified polycarbonate polyol in the polycarbonate polyol composition include, but are not particularly limited to, a method of performing fractionation or separation by GPC (gel permeation chromatography), NMR measurement, magnetic gradient NMR measurement, and FT-IR measurement. Also, the presence of the unmodified polycarbonate polyol can be confirmed from the presence or absence of a carbonate group-derived structure, the presence or absence of a urethane group-derived structure and the ratio therebetween, etc.

The content ratio between the unmodified polycarbonate polyol and the modified polycarbonate polyol preferably falls within the range of the value of PB/PA or the range of the value of PB/POH mentioned later, and more preferably falls within the range of the value PB/PA and the range of the value of PB/POH.

Examples of the production method for allowing the polycarbonate polyol composition of the present embodiment to contain the unmodified polycarbonate polyol include, but are not particularly limited to, the following methods 1) and 2):

1) a method of producing starting materials polycarbonate polyol and isocyanate compound in the range of NCO/OH=less than 0.5; and 2) a method of adding a starting material polycarbonate polyol to the modified polycarbonate polyol.

In the polycarbonate polyol composition of the present embodiment, 90% by mol or more of the total quantity of terminal groups of all the compounds in the composition is hydroxy groups. Preferably, 92 to 100% by mol of the total quantity of terminal groups is hydroxy groups. More preferably, 95 to 100% by mol of the total quantity of terminal groups is hydroxy groups.

When the amount of the hydroxy groups among the terminal groups falls within the range described above, the polycarbonate polyol composition of the present embodiment is excellent in compatibility with DPM and can form a coating material composition excellent in drying properties and a coating film and/or a polyurethane film excellent in endurance.

Examples of the method for controlling the amount of the hydroxy groups among the terminal groups of all the compounds in the polycarbonate polyol composition of the present embodiment within the range described above include, but are not particularly limited to, a method using starting materials having high purity in the production of the polycarbonate polyol composition, and a method of suppressing the dehydration of terminal hydroxy groups by setting a reaction temperature to 200° C. or lower in the production of the polycarbonate polyol composition.

In the polycarbonate polyol composition of the present embodiment, examples of terminal groups other than the hydroxy groups include, but are not particularly limited to, alkyl groups, a vinyl group, and aryl groups.

In the present embodiment, the amount of the hydroxy groups among the terminal groups can be measured by use of a method described in Examples mentioned later.

The lower limit of the hydroxy value of the polycarbonate polyol composition of the present embodiment is preferably 5 mg-KOH/g or more, more preferably 10 mg-KOH/g or more, further preferably 15 mg-KOH/g or more, still further preferably 20 mg-KOH/g or more, particularly preferably 25 mg-KOH/g or more, extremely preferably 30 mg-KOH/g or more. The upper limit thereof is preferably 700 mg-KOH/g or less, more preferably 500 mg-KOH/g or less, further preferably 400 mg-KOH/g or less, still further preferably 350 mg-KOH/g or less, particularly preferably 300 mg-KOH/g or less, extremely preferably 250 mg-KOH/g or less. When the hydroxy value of the polycarbonate polyol composition falls within the range described above, the resulting polycarbonate polyol composition tends to be excellent in compatibility with DPM. A coating material composition obtained from such a polycarbonate polyol composition tends to have better drying properties, and a coating film and/or a polyurethane film obtained therefrom tends to have better endurance.

Examples of the method for controlling the hydroxy value of the polycarbonate polyol composition of the present embodiment within the range described above include, but are not particularly limited to, a method of adding starting materials polycarbonate polyol and isocyanate compound such that the hydroxy value falls within the range described above in the production of the polycarbonate polyol composition, and a control method of adding and/or extracting a polyhydric alcohol compound in the production of the polycarbonate polyol composition.

In the present embodiment, the hydroxy value can be calculated by use of a method described in Examples mentioned later.

The APHA of the polycarbonate polyol composition of the present embodiment is preferably 100 or less, more preferably 80 or less, further preferably 50 or less, particularly preferably 30 or less. When the APHA is equal to or less than the upper limit value, a coating material composition and a polyurethane obtained from the polycarbonate polyol composition tend to be excellent in chromaticity and weather resistance. The lower limit value of the APHA of the polycarbonate polyol composition of the present embodiment is not particularly limited and is, for example, 0.

Examples of the method for controlling the APHA of the polycarbonate polyol composition of the present embodiment within the range described above include, but are not particularly limited to, a method of using a starting material having APHA of 100 or less in the production of the polycarbonate polyol composition, and a method of suppressing staining by setting a reaction temperature to 200° C. or lower in the production of polycarbonate polyol composition.

In the present embodiment, the APHA can be measured by use of a method described in Examples mentioned later.

(R)

In the formula (A), R is a divalent linear, branched or cyclic aliphatic hydrocarbon group optionally containing a heteroatom, or a divalent aromatic hydrocarbon group optionally containing a heteroatom.

For the divalent linear aliphatic hydrocarbon group optionally containing a heteroatom represented by R, the lower limit of the molecular weight of R is preferably 20 or higher, more preferably 30 or higher, further preferably 40 or higher. The upper limit of the molecular weight of R is preferably 3000 or lower, more preferably 2500 or lower, further preferably 2200 or lower.

When R is, for example, an ethylene group ($-CH_2-CH_2-$), the molecular weight of R is (12+1×2)+(12+1×2)=28.

Specific examples of the divalent linear aliphatic hydrocarbon group optionally containing a heteroatom represented by R include, but are not particularly limited to, an ethylene group, a propylene group, a butylene group, a pentylene group, a hexylene group, a heptylene group, an octylene group, a nonylene group, a decylene group, an oxyethylene group, an oxytetramethylene group, a polyoxyethylene group, a polyoxytetramethylene group, fluoroalkyl groups, and perfluoroalkyl groups. Among others, a propylene group, a butylene group, a pentylene group, a hexylene group, a nonylene group, a decylene group, an oxyethylene group, an oxytetramethylene group, a polyoxyethylene group, or a polyoxytetramethylene group is preferred from the viewpoint of versatility.

For the divalent branched aliphatic hydrocarbon group optionally containing a heteroatom represented by R, the lower limit of the molecular weight of R is preferably 20 or higher, more preferably 30 or higher, further preferably 40 or higher. The upper limit of the molecular weight of R is preferably 3000 or lower, more preferably 2500 or lower, further preferably 2200 or lower.

Specific examples of the divalent branched aliphatic hydrocarbon group optionally containing a heteroatom represented by R include, but are not particularly limited to, an isopropylene group, an isobutylene group, a tert-butylene group, an isopentylene group, a 2,2-dimethyltrimethylene group, an isohexylene group, an isoheptylene group, an isooctylene group, an oxy-1-methylethylene group, an oxy-2,2-dimethyltrimethylene group, and a polyoxy-1-methylethylene group. Among others, an isopropylene group, an isobutylene group, an isopentylene group, a 2,2-dimethyltrimethylene group, an isohexylene group, an oxy-1-methylethylene group, or a polyoxy-1-methylethylene group is preferred from the viewpoint of versatility.

For the divalent cyclic aliphatic hydrocarbon group optionally containing a heteroatom represented by R, the lower limit of the molecular weight of R is preferably 20 or higher, more preferably 30 or higher, further preferably 40 or higher. The upper limit of the molecular weight of R is preferably 3000 or lower, more preferably 2500 or lower, further preferably 2200 or lower.

Specific examples of the divalent cyclic aliphatic hydrocarbon group optionally containing a heteroatom represented by R include, but are not particularly limited to, a cyclobutylene group, a cyclopentylene group, a cyclohexylene group, and a cycloheptylene group.

For the divalent aromatic hydrocarbon group optionally containing a heteroatom represented by R, the lower limit of the molecular weight of R is preferably 20 or higher, more preferably 30 or higher, further preferably 40 or higher. The upper limit of the molecular weight of R is preferably 3000 or lower, more preferably 2500 or lower, further preferably 2200 or lower.

Specific examples of the divalent aromatic hydrocarbon group optionally containing a heteroatom represented by R include, but are not particularly limited to, a phenylene group and a naphthylene group.

Among others, R is preferably a divalent linear, branched or cyclic aliphatic hydrocarbon group optionally containing a heteroatom with a lower limit of R molecular weight of 20 or higher, more preferably a divalent linear aliphatic hydrocarbon group optionally containing a heteroatom with a lower limit of a R molecular weight of 30 or higher, or a divalent branched aliphatic hydrocarbon group optionally containing a heteroatom with a lower limit of a R molecular weight of 30 or higher, further preferably a divalent linear aliphatic hydrocarbon group optionally containing a heteroatom with a lower limit of a R molecular weight of 40 or higher. R is preferably a divalent linear, branched or cyclic aliphatic hydrocarbon group optionally containing a heteroatom with a upper limit of R molecular weight of 3000 or lower, more preferably a divalent linear aliphatic hydrocarbon group optionally containing a heteroatom with a upper limit of a R molecular weight of 2500 or lower, or a divalent branched aliphatic hydrocarbon group optionally containing a heteroatom with a upper limit of a R molecular weight of 2500 or lower, further preferably a divalent linear aliphatic hydrocarbon group optionally containing a heteroatom with a upper limit of a R molecular weight of 2200 or lower.

In the polycarbonate polyol composition of the present embodiment, the lower limit of the number of functional groups calculated according to the expression (II) given below is 2.00 or more, preferably 2.20 or more, more preferably 2.30 or more, further preferably 2.40 or more, still further preferably 2.45 or more, particularly preferably 2.50 or more. The upper limit of the number of functional groups is 10.00 or less, preferably 8.00 or less, more preferably 6.00 or less, further preferably 5.00 or less, still further preferably 4.50 or less, particularly preferably 3.50 or less, extremely preferably 3.40 or less.

$$\text{The number of functional groups} = Mn \times OHV/56.11/1000 \quad \text{(II)}$$

wherein Mn represents a number-average molecular weight of the polycarbonate polyol composition determined by GPC measurement, and OHV represents a hydroxy value of the polycarbonate polyol composition.

When the number of functional groups falls within the range described above, a coating material composition obtained using the polycarbonate polyol composition of the present embodiment tends to be much superior in drying properties and a polyurethane obtained using the polycarbonate polyol composition of the present embodiment tends to be much superior in endurance.

Examples of the method for controlling the number of functional groups in the polycarbonate polyol composition of the present embodiment within the range described above include, but are not particularly limited to, a method of adding starting materials polycarbonate polyol and isocyanate compound such that the number of functional groups falls within the range described above in the production of the polycarbonate polyol composition, and a control method of adding and/or extracting a polyhydric alcohol compound in the production of the polycarbonate polyol composition.

In the present embodiment, the number of functional groups in the polycarbonate polyol composition can be calculated by use of a method described in Examples mentioned later.

The lower limit of the number-average molecular weight (Mn) of the polycarbonate polyol composition of the present embodiment is preferably 300 or higher, more preferably 400 or higher, further preferably 500 or higher, still further preferably 800 or higher, particularly preferably 1000 or higher, more particularly preferably 1200 or higher, extremely preferably 1400 or higher. The upper limit of the number-average molecular weight (Mn) of the polycarbonate polyol composition of the present embodiment is preferably 10000 or lower, more preferably 8000 or lower, further preferably 5000 or lower, still further preferably 4500 or lower, particularly preferably 4000 or lower, more particularly preferably 3800 or lower, extremely preferably 3500 or lower, more extremely preferably 3200 or lower.

When the number-average molecular weight (Mn) falls within the range described above, the polycarbonate polyol composition of the present embodiment is excellent in compatibility with DPM and water dispersibility. A coating material composition obtained using such a polycarbonate polyol composition tends to be much superior in drying properties, and a polyurethane obtained using such a polycarbonate polyol composition tends to be much superior in endurance.

Examples of the method for controlling the number-average molecular weight (Mn) of the polycarbonate polyol composition of the present embodiment within the range described above include, but are not particularly limited to, a method of adding starting materials polycarbonate polyol and isocyanate compound such that the number-average molecular weight (Mn) falls within the range described above in the production of the polycarbonate polyol composition, and a control method of adding and/or extracting a polyhydric alcohol compound in the production of the polycarbonate polyol composition.

In the present embodiment, the number-average molecular weight (Mn) of the polycarbonate polyol composition can be calculated by GPC measurement described in Examples mentioned later.

The lower limit of the molecular weight distribution (Mw/Mn) of the polycarbonate polyol composition of the present embodiment is preferably 1.00 or more, more preferably 1.20 or more, further preferably 1.50 or more, still further preferably 1.80 or more, particularly preferably 2.00 or more, more particularly preferably 2.10 or more, extremely preferably 2.20 or more. The upper limit thereof is preferably 7.00 or less, more preferably 6.00 or less, further preferably 5.00 or less, still further preferably 4.50 or less, particularly preferably 4.00 or less, more particularly preferably 3.70 or less, extremely preferably 3.50 or less, more extremely preferably 3.30 or less.

When the molecular weight distribution (Mw/Mn) falls within the range described above, the polycarbonate polyol composition of the present embodiment is excellent in compatibility with DPM and water dispersibility. A coating material composition obtained using such a polycarbonate polyol composition tends to be much superior in drying properties, and a polyurethane obtained using such a polycarbonate polyol composition tends to be much superior in endurance.

Examples of the method for controlling the molecular weight distribution (Mw/Mn) of the polycarbonate polyol composition of the present embodiment within the range described above include, but are not particularly limited to, a method of adding starting materials polycarbonate polyol and isocyanate compound such that the molecular weight distribution (Mw/Mn) falls within the range described above in the production of the polycarbonate polyol composition, and a control method of adding and/or extracting a polyhydric alcohol compound in the production of the polycarbonate polyol composition.

In the present embodiment, the number-average molecular weight (Mn) and weight-average molecular weight (Mw) of the polycarbonate polyol composition can be calculated by GPC measurement described in Examples mentioned later. The molecular weight distribution (Mw/Mn) can be determined from the calculated number-average molecular weight (Mn) and weight-average molecular weight (Mw) according to the following expression (III):

Molecular weight distribution (Mw/Mn)=Weight-average molecular weight (Mw)/Number-average molecular weight (Mn) (III)

In infrared absorption spectrum absorbance measured by FT-IR of the polycarbonate polyol composition of the present embodiment, when a height of an infrared absorption spectrum absorbance (Abs) peak around a wavenumber of 1743 $cm^{-1}$ derived mainly from the carbonate structure represented by the formula (A) is defined as PA and when a height of an infrared absorption spectrum absorbance (Abs) peak around a wavenumber of 1691 $cm^{-1}$ derived mainly from the urethane structure represented by the formula (B) is defined as PB, the lower limit of the value of PB/PA is preferably 0.01 or more, more preferably 0.05 or more, further preferably 0.08 or more, still further preferably 0.10 or more, particularly preferably 0.12 or more, more particularly preferably 0.15 or more. The upper limit thereof is preferably 1.00 or less, more preferably 0.80 or less, further preferably 0.70 or less, still further preferably 0.60 or less, particularly preferably 0.50 or less, more particularly preferably 0.40 or less, extremely preferably 0.35 or less. When the value of PB/PA falls within the range described above, the polycarbonate polyol composition of the present embodiment is excellent in compatibility with DPM. A coating material composition and a polyurethane obtained from such a polycarbonate polyol composition tend to be excellent in endurance and flexibility.

Examples of the method for controlling the value of PB/PA of the polycarbonate polyol composition of the present embodiment within the range described above include, but are not particularly limited to, a method of adding starting materials polycarbonate polyol and isocyanate compound such that the value of PB/PA falls within the range described above while measured by FT-IR in the production of the polycarbonate polyol composition, and a method of adding starting materials polycarbonate polyol and isocyanate compound such that a calculated value of PB/PA determined from the number of moles of a urethane group and the number of moles of a carbonate group in the resulting polycarbonate polyol composition according to the following expression (IV) falls within the range of PB/PA described above:

$$\text{Calculated PB/PA}=0.0282\times X1+0.1595 \quad \text{(IV)}$$

X1=(The number of moles of a urethane group/The number of moles of a carbonate group)×100

Specifically, for example, in the case of adding 1 mol of polycarbonate diol with a number-average molecular weight (Mn) of 2000 having 1,6-hexanediol alone as a diol component at NCO/OH=0.2 using hexamethylene diisocyanate, the calculated value of PB/PA of the resulting polycarbonate polyol composition determined from the number of moles of a urethane group and the number of moles of a carbonate group is as follows:

$$\text{Calculated PB/PA}=0.0282\times\{(0.40/13.07)\times100\}+0.1595=0.24.$$

In the calculation expression, "13.70" represents the number of moles of a carbonate group in 1 mol of the polycarbonate diol with a number-average molecular weight (Mn) of 2000 having 1,6-hexanediol alone, and "0.40" represents the number of moles of a urethane group formed in adding hexamethylene diisocyanate at NCO/OH=0.2 to 1 mol of the polycarbonate diol.

The number of moles of a carbonate group in 1 mol of the polycarbonate diol can be calculated according to the following expression (V):

$$\text{The number of moles of a carbonate group}=(Mn-34-mR1)/(60+mR1) \quad \text{(V)}$$

In the formula (V), Mn represents a number-average molecular weight (Mn), and can be calculated by GPC measurement described in Examples mentioned later. In the formula (V), mR1 represents a molecular weight of R1 in a polycarbonate diol represented by the formula (A1) given below.

Specifically, for example, for polycarbonate polyol with a number-average molecular weight (Mn) of 2000 having 1,6-hexanediol alone, R1=(12+2)×6=84, and the number of moles of a carbonate group calculated according to the expression (V) is as follows:

The number of moles of a carbonate group=(2000−34−84)/(60+84)=13.07

(A1)

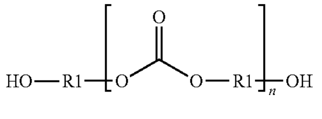

wherein R1 represents a divalent linear, branched or cyclic aliphatic hydrocarbon group optionally containing a heteroatom, or a divalent aromatic hydrocarbon group optionally containing a heteroatom, and a plurality of R1 moieties are the same as or different from each other; and n is a number of 1 or larger and 50 or smaller.

In the present embodiment, the value of PB/PA of the polycarbonate polyol composition can be calculated by use of a method described in Examples mentioned later.

In infrared absorption spectrum absorbance measured by FT-IR of the polycarbonate polyol composition of the present embodiment, when a height of an infrared absorption spectrum absorbance (Abs) peak around a wavenumber of 1691 $cm^{-1}$ derived mainly from the urethane structure represented by the formula (B) is defined as PB and when a height of an infrared absorption spectrum absorbance (Abs) peak around a wavenumber of 3000 to 3800 $cm^{-1}$ derived mainly from a hydroxy group is defined as POH, the lower limit of the value of PB/POH is preferably 0.50 or more, more preferably 1.00 or more, further preferably 1.10 or more, still further preferably 1.20 or more, particularly preferably 1.30 or more, more particularly preferably 1.50 or more. The upper limit of the value of PB/POH is preferably 10.00 or less, more preferably 7.00 or less, further preferably 5.00 or less, still further preferably 4.50 or less, particularly preferably 4.00 or less, more particularly preferably 3.50 or more. When the value of PB/POH falls within the range described above, the polycarbonate polyol composition of the present embodiment is excellent in compatibility with DPM. A coating material composition obtained from such a polycarbonate polyol composition tends to be excellent in pot life.

Examples of the method for controlling the value of PB/POH of the polycarbonate polyol composition of the present embodiment within the range described above include, but are not particularly limited to, a method of adding starting materials polycarbonate polyol and isocyanate compound such that the value of PB/POH falls within the range described above in the production of the polycarbonate polyol composition, a method of suppressing dehydration by setting a reaction temperature to 200° C. or lower in the production of polycarbonate polyol composition, and a method of adding starting materials polycarbonate polyol and isocyanate compound such that a calculated value of PB/POH determined from the number of moles of a urethane group and the number of moles of a hydroxy group in the resulting polycarbonate polyol composition according to the following expression (VI) falls within the range of PB/POH described above:

$$\text{Calculated PB/POH}=0.0911\times X2+0.8451 \quad \text{(VI)}$$

X2=(The number of moles of a urethane group/The number of moles of a hydroxy group)×100

Specifically, for example, in the case of adding polycarbonate diol (1 mol) with a number-average molecular weight (Mn) of 2000 having 1,6-hexanediol alone as a diol component at NCO/OH=0.2 using hexamethylene diisocyanate, the calculated value of PB/POH of the resulting polycarbonate polyol composition determined from the number of moles of a urethane group and the number of moles of a hydroxy group is as follows:

$$\text{Calculated PB/POH}=0.0911\times\{(0.40/1.60)\times100\}+0.8451=3.12.$$

In the calculation expression, "0.40" represents the number of moles of a urethane group formed in adding hexamethylene diisocyanate at NCO/OH=0.2 to 1 mol of the polycarbonate diol, and "1.60" represents the number of moles of a hydroxy value remaining in adding hexamethylene diisocyanate at NCO/OH=0.2 to 1 mol of the polycarbonate diol.

In the present embodiment, the value of PB/POH of the polycarbonate polyol composition can be calculated by use of a method described in Examples mentioned later.

In the polycarbonate polyol composition of the present embodiment, the modified polycarbonate polyol can have a cyclic structure. Examples of the cyclic structure include, but are not particularly limited to, aliphatic hydrocarbon groups optionally containing a heteroatom, and aromatic hydrocarbon groups optionally containing a heteroatom. Among them, an aliphatic hydrocarbon group optionally containing a heteroatom is preferred from the viewpoint of endurance. Specific examples of the aliphatic hydrocarbon group optionally containing a heteroatom include, but are not particularly limited to, a cyclobutylene group, a cyclopentylene group, a cyclohexylene group, a cycloheptylene group, isosorbide-derived cyclic groups, an isocyanurate group, a uretdione group, and an iminooxadiazinedione group. Among others, the cyclic structure is preferably an isocyanurate ring.

In the polycarbonate polyol composition of the present embodiment, the unmodified polycarbonate polyol and/or the modified polycarbonate polyol can have a hydrophilic structure. Examples of the hydrophilic structure include, but are not particularly limited to, nonionic hydrophilic groups, anionic hydrophilic groups, and cationic hydrophilic groups. Among them, a nonionic hydrophilic group and an anionic hydrophilic group are preferred from the viewpoint of versatility. Specific examples of the nonionic hydrophilic group include, but are not particularly limited to, an oxyethylene group and a polyoxyethylene group. Specific examples of the anionic hydrophilic group include, but are not particularly limited to, a sulfonic acid group and a carboxyl group.

The lower limit of the content of the unmodified polycarbonate polyol and/or the modified polycarbonate polyol having a hydrophilic structure in the polycarbonate polyol composition is not particularly limited. Preferably, the hydrophilic structure is contained so as to attain Δ or ○ in the evaluation of water dispersibility described in Examples mentioned later. More preferably, the hydrophilic structure is contained so as to attain ○ in the evaluation of water dispersibility described in Examples mentioned later. The upper limit thereof is preferably 50% by mol or less, more preferably 35% by mol or less, further preferably 30% by mol or less, still further preferably 25% by mol or less, particularly preferably 20% by mol or less, more particularly preferably 15% by mol or less, extremely preferably 10% by mol or less.

When the content of the unmodified polycarbonate polyol and/or the modified polycarbonate polyol having a hydrophilic structure in the polycarbonate polyol composition falls within the range described above, the polycarbonate polyol composition of the present embodiment tends to offer a stable aqueous dispersion. A coating material composition and a polyurethane obtained from such a polycarbonate polyol composition tend to be excellent in endurance and flexibility.

The polycarbonate polyol composition of the present embodiment is preferably capable of being dispersed in water. When the polycarbonate polyol composition of the present embodiment is capable of being dispersed in water, an aqueous coating material composition and/or an aqueous polyurethane obtained using the polycarbonate polyol composition tends to have favorable stability.

The capability of the polycarbonate polyol composition of being dispersed in water can be determined from water dispersibility described in Examples mentioned later.

The polycarbonate polyol composition of the present embodiment may consist of the polycarbonate polyols alone or may contain an additional component without inhibiting the advantageous effects of the present invention. Examples of the additional component include, but are not particularly limited to, polyhydric alcohol compounds, and polyols described in Japanese Patent Laid-Open No. 2018-012769, such as polyester polyol, acrylic polyol, polyether polyol, polyolefin polyol, and fluorine polyol.

[Method for Producing Polycarbonate Polyol Composition]

The polycarbonate polyol composition of the present embodiment can be obtained, for example, through the reaction of a polycarbonate polyol with an isocyanate compound in the presence of a transesterification reaction catalyst.

If too large an amount of the catalyst remains in the polycarbonate polyol composition, the polycarbonate polyol composition may become white turbid or may be easily stained by heating. Such a catalyst may inhibit reaction in producing a polyurethane or may accelerate the reaction too much. Too small an amount of the catalyst is not preferred because the progression of the reaction tends to be slowed.

Hence, the amount of the catalyst remaining in the polycarbonate polyol composition is not particularly limited. The lower limit of its content based on a catalyst metal is preferably 0.00001% by mass or more, more preferably 0.00005% by mass or more, further preferably 0.0001% by mass or more, still further preferably 0.0005% by mass or more. The upper limit thereof is preferably 0.1% by mass or less, more preferably 0.05% by mass or less, further preferably 0.03% by mass or less, still further preferably 0.02% by mass or less, particularly preferably 0.015% by mass or less, more particularly preferably 0.01% by mass or less, extremely preferably 0.005% by mass or less.

The APHA of each starting material for use in producing the polycarbonate polyol composition of the present embodiment is preferably 100 or less, more preferably 80 or less, further preferably 50 or less, still further preferably 30 or less, particularly preferably 20 or less. When the APHA of the starting material is equal to or less than the value described above, the resulting polycarbonate polyol composition tends to be excellent in chromaticity (APHA).

(Polycarbonate Polyol)

The polycarbonate polyol for use in producing the polycarbonate polyol composition of the present embodiment is not particularly limited and can be obtained by a method for producing a polycarbonate polyol mentioned later. Alternatively, a commercially available product may be used. Examples thereof include, but are not particularly limited to, "DURANOL (trade name)" series T6002, T6001, T5652, T5651, T5650J, T5650E, G4672, T4672, T4671, G3452, G3450J, and AK011 manufactured by Asahi Kasei Corp.

(Isocyanate Compound)

Examples of the isocyanate compound for use in producing the polycarbonate polyol composition of the present embodiment can include, but are not particularly limited to, aliphatic diisocyanate such as hexamethylene diisocyanate and trimethylhexamethylene diisocyanate, alicyclic diisocyanate such as isophorone diisocyanate, aromatic diisocyanate such as tolylene diisocyanate, 4,4'-diphenylmethane diisocyanate (hereinafter, also abbreviated to "MDI"), xylylene diisocyanate and naphthylene diisocyanate, isocyanate compounds having three or more isocyanate groups, such as triphenylmethane-4,4'-4"-triisocyanate, 1,3,5-triisocyanatobenzene, 2,4,6-triisocyanatotoluene and 4,4'-dimethyldiphenylmethane-2,2',5,5'-tetraisocyanate, and isocyanurate-modified products and biuret-modified products of these isocyanate compounds. Examples of the commercially available product of the isocyanate compound include, but are not particularly limited to, "DURANATE (trade name)" series 24A-100, 22A-75P, TPA-100, TKA-100, P301-75E, D101, D201, 21S-75E, MFA-75B, MHG-80B, TUL-100, TLA-100, TSA-100, TSS-100, TSE-100, E402-80B, E405-80B, AE700-100, A201H, 17B-60P, TPA-B80E, MF-B60B, MF-K60B, SBB-70P, SBN-70D, E402-B80B, WB40-100, WT30-100, WT31-100, WB40-80D, WT20-100, WL70-100, WE50-100, and WM44-L70G manufactured by Asahi Kasei Corp.

[Production Conditions for Polycarbonate Polyol Composition]

The reaction of the polycarbonate polyol with the isocyanate compound is not particularly limited and, specifically, can be carried out, for example, by mixing these starting materials and stirring the mixture under heating.

The temperature of the reaction is not particularly limited. The lower limit thereof is preferably 50° C. or higher, more preferably 60° C. or higher, further preferably 70° C. or higher, still further preferably 80° C. or higher. The upper limit thereof is preferably 250° C. or lower, more preferably 200° C. or lower, further preferably 180° C. or lower, still further preferably 160° C. or lower.

When the reaction temperature is equal to or higher than the lower limit value described above, the reaction can be performed in a shorter time, leading to excellent cost efficiency. When the reaction temperature is equal to or lower than the upper limit value described above, the resulting polycarbonate polyol composition can be more effectively prevented from being stained.

The reaction pressure is not particularly limited and is preferably atmospheric pressure or higher and 1 MPa or lower. When the reaction pressure falls within the range described above, the reaction can be more conveniently carried out. In the case of using an auxiliary material, the reaction can be more efficiently accelerated at a pressure increased to some extent in consideration of vapor pressure thereof, etc.

The progression and completion of the reaction can be confirmed by GPC (gel permeation chromatography) measurement and FT-IR (Fourier transform infrared spectrometer). As the reaction progresses, a peak derived from a starting material is decreased in height or area over time in GPC measurement. The progression and completion can be confirmed from the disappearance of the peak. Also, the progression and completion can be confirmed from the disappearance of an infrared absorption spectrum absorbance (Abs) peak around a wavenumber of 2273 $cm^{-1}$ derived from an isocyanate group (—NCO group) in FT-IR.

In the method for producing the polycarbonate polyol composition of the present embodiment, for example, the step of dehydrating the starting materials used may be performed as pretreatment before the reaction described above.

[Method for Producing Polycarbonate Polyol]

A method for producing the polycarbonate polyol for use in the production of the polycarbonate polyol composition of the present embodiment is not particularly limited, and a method known in the art may be adopted. The polycarbonate polyol can be obtained, for example, through the reaction of a carbonate compound with a diol compound in the presence of a transesterification catalyst.

(Carbonate Compound)

Examples of the carbonate compound for use in the production of the polycarbonate polyol include, but are not limited to, alkylene carbonate, dialkyl carbonate, and diaryl carbonate.

Examples of the alkylene carbonate include, but are not particularly limited to, ethylene carbonate, trimethylene carbonate, 1,2-propylene carbonate, 1,2-butylene carbonate, 1,3-butylene carbonate, and 1,2-pentylene carbonate.

Examples of the dialkyl carbonate include, but are not particularly limited to, dimethyl carbonate, diethyl carbonate, dipropyl carbonate, and dibutyl carbonate.

Examples of the diaryl carbonate include, but are not particularly limited to, diphenyl carbonate.

Among others, the carbonate compound for use in the production of the polycarbonate polyol is preferably alkylene carbonate, more preferably dimethyl carbonate and ethylene carbonate.

(Polyhydric Alcohol Compound)

Examples of the polyhydric alcohol compound for use in the production of the polycarbonate polyol include, but are not limited to, linear polyhydric alcohol compounds, branched polyhydric alcohol compounds, cyclic polyhydric alcohol compounds, and polyhydric alcohol compounds having an aromatic ring.

Examples of the linear polyhydric alcohol compounds include, but are not particularly limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, diethylene glycol, triethylene glycol, polyethylene glycol, and polytetraethylene glycol.

Examples of the branched polyhydric alcohol compound include, but are not particularly limited to, 2-methyl-1,8-octanediol, neopentyl glycol, 2-ethyl-1,6-hexanediol, 2-methyl-1,3-propanediol, 3-methyl-1,5-pentanediol, 2,4-dimethyl-1,5-pentanediol, 2,4-diethyl-1,5-pentanediol, trimethylolpropane, pentaerythritol, and polypropylene glycol.

Examples of the cyclic polyhydric alcohol compound include, but are not particularly limited to, 1,3-cyclohexanediol, 1,4-cyclohexanediol, 1,4-cyclohexanedimethanol, and 2-bis(4-hydroxycyclohexyl)-propane isosorbide.

[Production Conditions for Polycarbonate Polyol]

For the production of the polycarbonate polyol, a transesterification reaction catalyst can be used.

Examples of the transesterification reaction catalyst include, but are not particularly limited to, alkali metals and alkaline earth metals, and alcoholates thereof, hydrides thereof, oxides thereof, amides thereof, hydroxides thereof and salts thereof.

Examples of the salts of the alkali metal and the alkaline earth metal include, but are not particularly limited to, carbonate, nitrogen-containing borate, and basic salts with organic acids.

Examples of the alkali metal include, but are not particularly limited to, lithium, sodium, and potassium.

Examples of the alkaline earth metal include, but are not particularly limited to, magnesium, calcium, strontium, and barium.

Examples of the transesterification catalyst using a metal other than alkali metals and alkaline earth metals include, but are not particularly limited to, metals other than alkali metals and alkaline earth metals, and salts thereof, alcoholates thereof, and organic compounds containing the metals.

Specific examples of the metal other than alkali metals and alkaline earth metals include, but are not particularly limited to, aluminum, titanium, vanadium, chromium, manganese, iron, cobalt, nickel, copper, zinc, gallium, germanium, zirconium, niobium, molybdenum, ruthenium, rhodium, palladium, silver, indium, tin, antimony, tungsten, rhenium, osmium, iridium, platinum, gold, thallium, lead, bismuth, and ytterbium.

One of these transesterification catalysts can be used alone, or two or more thereof can be used in combination.

Among others, the transesterification reaction catalyst is preferably at least one metal selected from the group consisting of sodium, potassium, magnesium, potassium, titanium, zirconium, tin, lead and ytterbium, or a salt thereof, an alkoxide thereof, or an organic compound containing the metal, because transesterification reaction to obtain the polycarbonate polyol is more favorably performed, and use of the resulting polycarbonate polyol has less influence on urethane reaction.

The transesterification reaction catalyst is more preferably at least one metal selected from the group consisting of magnesium, titanium, ytterbium, tin, zinc, and zirconium. The transesterification reaction catalyst is further preferably one or more metals selected from the group consisting of magnesium, titanium, ytterbium, zinc and zirconium.

Specific examples of the preferred transesterification catalyst include organic compounds of titanium, organic compounds of magnesium, organic compounds of zinc, organic compounds of ytterbium, and organic compounds of zirconium.

Examples of the organic compound of titanium include, but are not particularly limited to, titanium tetra-n-butoxide, titanium tetra-n-propoxide, and titanium tetraisopropoxide.

Examples of the organic compound of magnesium include, but are not particularly limited to, magnesium acetate, magnesium(II) acetylacetonate, and 2,2,6,6-tetramethyl-3,5-heptanedionatomagnesium(II) dihydrate.

Examples of the organic compound of zinc include, but are not particularly limited to, zinc acetate, zinc(II) acetylacetonate, and 2,2,6,6-tetramethyl-3,5-heptanedionatozinc (II).

Examples of the organic compound of ytterbium include, but are not particularly limited to, ytterbium(III) isopropoxide, ytterbium(III) trifluoromethanesulfonate, tris(cyclopentadienyl)ytterbium(III), and acetylacetonatoytterbium(III) hydrate.

Examples of the organic compound of zirconium include, but are not particularly limited to, zirconium(IV) acetylacetone, zirconium(IV) tetrapropoxide, zirconium(IV) tetrabutoxide, and zirconium(IV) acetylacetonate.

The lower limit of the amount of the transesterification reaction catalyst used is preferably 0.00001% by mass or more, more preferably 0.0001% by mass or more, based on the total mass of the starting materials. The upper limit thereof is preferably 0.1% by mass or less, more preferably 0.05% by mass or less, further preferably 0.025% by mass or less, still further preferably 0.015% by mass or less, particularly preferably 0.01% by mass or less.

The transesterification catalyst used in transesterification reaction is not consumed by the transesterification reaction when heat treatment is performed subsequently to the production of the polycarbonate polyol. Therefore, its amount can be calculated on the basis of the amount of the transesterification reaction catalyst used. In the case of using, for example, commercially available polycarbonate polyol, the amount of a metal of the transesterification reaction catalyst contained in the polycarbonate polyol is determined by ICP (inductively coupled plasma) measurement.

If too large an amount of the catalyst remains in the polycarbonate polyol, the polycarbonate diol may become white turbid or may be easily stained by heating. Such a catalyst may inhibit reaction in producing a polyurethane or may accelerate the reaction too much. Too small an amount of the catalyst is not preferred because the progression of the reaction tends to be slowed.

Hence, the amount of the catalyst remaining in the polycarbonate polyol is not particularly limited. The lower limit of its content based on a catalyst metal is preferably 0.00001% by mass or more, more preferably 0.00005% by mass or more, further preferably 0.0001% by mass or more, still further preferably 0.0005% by mass or more. The upper limit thereof is preferably 0.1% by mass or less, more preferably 0.05% by mass or less, further preferably 0.03% by mass or less, still further preferably 0.02% by mass or less, particularly preferably 0.015% by mass or less, more particularly preferably 0.01% by mass or less, extremely preferably 0.005% by mass or less.

The polycarbonate polyol used in the present embodiment may be produced through the transesterification reaction of a polycarbonate polyol with a diol compound, or two or more types of polycarbonate polyols.

When the starting material polycarbonate polyol contains a catalyst poison for the transesterification reaction catalyst, etc. used in the production thereof, transesterification reaction usually tends to be less likely to progress. Hence, for the production of the polycarbonate polyol, the transesterification reaction catalyst described above can be newly added in a necessary amount.

On the other hand, when the starting material polycarbonate polyol contains no catalyst poison for the transesterification reaction catalyst, the transesterification reaction according to the present embodiment usually tends to be more likely to progress. However, in the case of, for example, further lowering a reaction temperature or further shortening a reaction time in the process of producing the polycarbonate polyol, the transesterification reaction catalyst can also be newly added in a necessary amount. In this case, the same transesterification reaction catalyst as that used in the production of the starting material polycarbonate polyol can be adopted.

Specifically, the transesterification reaction can be carried out by mixing starting materials, and stirring the mixture under heating.

The temperature of the transesterification reaction is not particularly limited and is preferably 120° C. or higher, more preferably 140° C. or higher, in terms of the lower limit and preferably 250° C. or lower, more preferably 200° C. or lower, in terms of the upper limit.

When the reaction temperature is equal to or higher than the lower limit value described above, the transesterification reaction can be performed in a shorter time, leading to excellent cost efficiency. When the reaction temperature is equal to or lower than the upper limit value described above, the resulting polycarbonate polyol can be more effectively prevented from being stained.

The reaction pressure of the transesterification reaction is not particularly limited and is preferably atmospheric pressure or higher and 1 MPa or lower. When the reaction pressure falls within the range described above, the reaction can be more conveniently carried out. In the case of using an auxiliary material, the transesterification reaction can be more efficiently accelerated at a pressure increased to some extent in consideration of vapor pressure thereof, etc.

The progression and completion of the transesterification reaction can be confirmed by GPC measurement. As the transesterification reaction progresses, a peak derived from a starting material is decreased in height or area over time. The progression and completion can be confirmed from the disappearance of the peak.

In the method for producing the polycarbonate polyol, for example, the step of dehydrating the starting materials used may be performed as pretreatment before the transesterification reaction described above.

In the method for producing the polycarbonate polyol, for example, the step of adding the aforementioned catalyst poison for the transesterification reaction catalyst may be performed as aftertreatment after the transesterification reaction described above.

[Coating Material]

The coating material of the present embodiment comprises the polycarbonate polyol composition mentioned above. The coating material of the present embodiment is excellent in drying properties by comprising the polycarbonate polyol composition mentioned above.

The coating material of the present embodiment is preferably an aqueous coating material. When the coating material of the present embodiment is an aqueous coating material, volatile organic compound (VOC) emission tends to be reduced.

The coating material of the present embodiment may contain an additional component in addition to the polycarbonate polyol composition mentioned above. Examples of the additional component include, but are not particularly limited to, curable compositions, polyhydric alcohol compounds, and polyols described in Japanese Patent Laid-Open No. 2018-012769, such as polyester polyol, acrylic polyol, polyether polyol, polyolefin polyol, and fluorine polyol.

The coating material (coating material composition) of the present embodiment can be supplemented with other additives, for example, a curing accelerator (catalyst), a flatting agent, an antisettling agent, a leveling agent, a filler, a dispersant, a flame retardant, a dye, an organic or inorganic pigment, a mold release agent, a rheology modifier, a plasticizer, an antioxidant, an ultraviolet absorber, a light stabilizer, an antifoaming agent, a colorant, and a solvent, according to various purposes, in addition to those described above. A coating material composition differing in nature, such as a soft-feel coating material and a clear coating material, can be obtained by appropriately containing these other additives.

The coating material of the present embodiment may be obtained using a polyurethane or an aqueous polyurethane mentioned later.

[Coating Agent]

The coating agent of the present embodiment comprises the polycarbonate polyol composition mentioned above. The coating agent of the present embodiment is excellent in drying properties by comprising the polycarbonate polyol composition mentioned above.

The coating agent of the present embodiment is preferably an aqueous coating agent. When the coating agent of the present embodiment is an aqueous coating agent, volatile organic compound (VOC) emission tends to be reduced.

The coating agent of the present embodiment may contain an additional component in addition to the polycarbonate polyol composition mentioned above. Examples of the additional component include, but are not particularly limited to, curable compositions, polyhydric alcohol compounds, and polyols described in Japanese Patent Laid-Open No. 2018-012769, such as polyester polyol, acrylic polyol, polyether polyol, polyolefin polyol, and fluorine polyol.

The coating agent (coating composition) of the present embodiment can be supplemented with other additives, for example, a curing accelerator (catalyst), a flatting agent, an antisettling agent, a leveling agent, a filler, a dispersant, a flame retardant, a dye, an organic or inorganic pigment, a mold release agent, a rheology modifier, a plasticizer, an antioxidant, an ultraviolet absorber, a light stabilizer, an antifoaming agent, a colorant, and a solvent, according to various purposes. A coating composition differing in nature, such as a soft-feel coating material and a clear coating material, can be obtained by appropriately containing these other additives.

The coating agent of the present embodiment may be obtained using a polyurethane or an aqueous polyurethane mentioned later.

[Polyurethane]

The polyurethane of the present embodiment is obtained using the polycarbonate polyol composition mentioned above. The polyurethane of the present embodiment obtained using the polycarbonate polyol composition mentioned above is excellent in endurance.

The aqueous polyurethane of the present embodiment is obtained using the polycarbonate polyol composition mentioned above. The aqueous polyurethane of the present embodiment obtained using the polycarbonate polyol composition mentioned above is excellent in endurance.

Examples of the method for obtaining the polyurethane of the present embodiment include, but are not particularly limited to, a prepolymer method (two-step method) of synthesizing a NCO group-terminated prepolymer using the polycarbonate polyol composition mentioned above and an isocyanate compound, and then extending the chain by the addition of a polyhydric alcohol or polyamine, and a one-shot method (one-step method) of polymerizing the polycarbonate polyol composition mentioned above, an isocyanate compound and a polyhydric alcohol and/or polyamine at the same time.

Examples of the method for obtaining the aqueous polyurethane of the present embodiment include, but are not particularly limited to, methods described in Examples of Japanese Patent Laid-Open No. 2017-71685.

[Leather]

The artificial leather of the present embodiment is obtained using the polyurethane or the aqueous polyurethane mentioned above. The artificial leather of the present embodiment obtained using the polyurethane or the aqueous polyurethane mentioned above is excellent in endurance.

The synthetic leather of the present embodiment is obtained using the polyurethane or the aqueous polyurethane mentioned above. The synthetic leather of the present embodiment obtained using the polyurethane or the aqueous polyurethane mentioned above is excellent in endurance.

[Coating Film]

The coating film of the present embodiment is obtained from the coating material or the coating agent mentioned above. The coating film of the present embodiment obtained from the coating material or the coating agent mentioned above is excellent in endurance.

[Film]

The film of the present embodiment is obtained from the coating material or the coating agent mentioned above. The film of the present embodiment obtained from the coating material or the coating agent mentioned above is excellent in endurance.

EXAMPLES

Hereinafter, the present embodiment will be described further specifically with reference to specific Examples and Comparative Examples. However, the present embodiment is not limited by these Examples and Comparative Examples by any means without departing from the spirit of the present invention. Physical properties and evaluation in Examples and Comparative Examples mentioned later were evaluated and performed by methods given below. In the present Examples, the terms "parts" and "%" are based on mass, unless otherwise specified.

[APHA]

The APHA (color in Hazen unit) of a polycarbonate polyol composition was measured in accordance with JIS K 0071-1. Specifically, a polycarbonate polyol composition obtained in each of Examples and Comparative Examples mentioned later was used as a sample. The sample was placed in a colorimetric tube, and its APHA was measured in comparison to a standard solution. The standard solution used was Color Standard Solution (1,000) for Chromaticity Test (manufactured by FUJIFILM Wako Pure Chemical Corp.).

[Measurement of Hydroxy Value (OHV)]

The hydroxy value of a polycarbonate polyol composition was measured by the following method.

A volumetric flask was used, and pyridine was added to 12.5 g of acetic anhydride so as to bring the amount to 50 mL, to prepare an acetylation reagent. A polycarbonate polyol composition obtained in each of Examples and Comparative Examples mentioned later was used as a sample. In a 100 mL eggplant-shaped flask, 1.0 to 10.0 g of the sample was weighed. To the eggplant-shaped flask, 5 mL of the acetylation reagent and 10 mL of toluene were added with a whole pipette to obtain a solution. Then, a condenser was attached to the eggplant-shaped flask, and the solution was stirred and heated at 100° C. for 1 hour. To the eggplant-shaped flask, 2.5 mL of distilled water was added with a whole pipette, and the obtained solution was further heated and stirred for 10 minutes. After cooling of the solution for 2 to 3 minutes, to the eggplant-shaped flask, 12.5 mL of ethanol was added, and 2 to 3 drops of phenolphthalein were added as an indicator, followed by titration with 0.5 mol/L ethanolic potassium hydroxide. Subsequently, in a 100 mL eggplant-shaped flask, 5 mL of the acetylation reagent, 10 mL of toluene and 2.5 mL of distilled water were placed, and heated and stirred for 10 minutes, followed by titration of the obtained solution in the same way as above (blank test). On the basis of the results, the hydroxy value of the polycarbonate polyol composition was calculated according to the following expression (I):

$$\text{Hydroxy value (mg-KOH/g)}=\{(b-a)\times 28.05\times f\}/e \qquad \text{(I)}$$

wherein a represents the amount of the sample titrated (mL); b represents the amount titrated (mL) in the blank test; e represents the amount of the sample (g); and f represents the factor of the titration solution.

[The Number of Functional Groups]

The number of functional groups in a polycarbonate polyol composition was calculated according to the following expression (II) from the value of the hydroxy value (OHV) mentioned above and the number-average molecular weight (Mn) of the polycarbonate polyol composition determined by GPC (gel permeation chromatography) measurement mentioned later.

$$\text{The number of functional groups}=\text{Mn}\times\text{OHV}/56.11/1000 \qquad \text{(II)}$$

In the formula (II), Mn represents a number-average molecular weight of the polycarbonate polyol composition determined by GPC measurement, and OHV represents a hydroxy value of the polycarbonate polyol composition.

[GPC Measurement]

The number-average molecular weight (Mn) and weight-average molecular weight (Mw) of a polycarbonate polyol composition were measured by GPC in accordance with the following method.

A polycarbonate polyol composition obtained in each of Examples and Comparative Examples mentioned later was used as a sample. The concentration of the measurement sample was adjusted to 0.5% by mass with tetrahydrofuran (hereinafter, referred to as THF). The number-average molecular weight (Mn) and weight-average molecular weight (Mw) of the polycarbonate polyol composition based on standard polystyrene were measured using a GPC apparatus given below.

GPC apparatus: HLC-8320 manufactured by Tosoh Corp.
Column: One column of TSKgel G4000H
 One column of G3000H
 Two columns of G2000H
Eluent: Tetrahydrofuran (THF)
Flow rate: 1.0 mL/min
Column temperature: 40° C.
RI detector: RI (apparatus: built-in HLC-8320)
Calibration curve: Standard polystyrene (manufactured by Tosoh Corp.)
 F-20 (molecular weight: $1.90\times10^5$)
 F-10 (molecular weight: $9.64\times10^4$)
 F-4 (molecular weight: $3.79\times10^4$)
 F-2 (molecular weight: $1.81\times10^4$)
 F-1 (molecular weight: $1.02\times10^4$)
 A-5000 (molecular weight: $5.97\times10^3$)
 A-2500 (molecular weight: $2.63\times10^3$)
 A-500
 A-1000

The molecular weights of a dimer to a decamer were calculated from A-500 and A-1000.

Dimer (molecular weight: 266)
Trimer (molecular weight: 370)
Tetramer (molecular weight: 474)
Pentamer (molecular weight: 578)
Hexamer (molecular weight: 682)
Heptamer (molecular weight: 786)
Octamer (molecular weight: 890)
Nonamer (molecular weight: 994)
Decamer (molecular weight: 1098)
Calibration curve expression: Cubic polynomial

[PB/PA Value]

A polycarbonate polyol composition obtained in each of Examples and Comparative Examples mentioned later was used as a sample, and its PB/PA value was determined as follows. The PB/PA value is a value obtained by dividing PB by PA wherein in infrared absorption spectrum absorbance of the sample measured by FT-IR (Fourier transform infrared spectrometer) mentioned later, a height of an infrared absorption spectrum absorbance (Abs) peak around a wavenumber of 1743 $cm^{-1}$ derived mainly from the carbonate structure represented by the formula (A) is defined as PA, and a height of an infrared absorption spectrum absorbance (Abs) peak around a wavenumber of 1691 $cm^{-1}$ derived mainly from the urethane structure represented by the formula (B) is defined as PB.

In the polycarbonate polyol composition, the presence or absence of unmodified and modified polycarbonate polyols was determined from the ratio between PA and PB measured here and/or the amount of each starting material added.

[PB/POH Value]

A polycarbonate polyol composition obtained in each of Examples and Comparative Examples mentioned later was used as a sample, and its PB/POH value was determined as follows. The PB/POH value is a value obtained by dividing PB by POH wherein in infrared absorption spectrum absorbance of the sample measured by FT-IR mentioned later, a height of an infrared absorption spectrum absorbance (Abs)

peak around a wavenumber of 1691 $cm^{-1}$ derived mainly from the urethane structure represented by the formula (B) is defined as PB, and a height of an infrared absorption spectrum absorbance (Abs) peak around a wavenumber of 3000 to 3800 $cm^{-1}$ derived mainly from a hydroxy group is defined as POH.

[FT-IR Measurement]

A polycarbonate polyol composition obtained in each of Examples and Comparative Examples mentioned later was used as a sample, and the infrared absorption spectrum absorbance of the sample was measured by FT-IR (Fourier transform infrared spectrometer) in accordance with the following method.

The measurement sample was thinly spread over a rock salt plate (NaCl plate, 35×35×5 mm), and the infrared absorption spectrum absorbance of the sample was measured by FT-IR using the following apparatus and conditions.

FI-IR apparatus: FT/IR-4600 type A (JASCO Corp.)
Light source: Standard light source
Detector: TGS
The number of scans: 16
Resolution: 4 $cm^{-1}$
Zero filling: On
Apodization: Cosine
Gain: Auto (2)
Aperture: Auto (7.1 mm)
Scan speed: Auto (2 mm/sec)
Filter: Auto (30000 Hz)
Data type: Equally spaced data
Abscissa: Wavenumber ($cm^{-1}$)
Ordinate: Abs
Start: 400 $cm^{-1}$
End: 40000 $cm^{-1}$

[Amount of Hydroxy Group in Total Quantity of Terminal Groups]

The amount of hydroxy groups in the total quantity of terminal groups of all the compounds in a polycarbonate polyol composition obtained in each of Examples and Comparative Examples mentioned later was measured in accordance with the method for measuring a primary terminal OH ratio described in Japanese Patent No. 3874664. Specifically, the measurement was performed as follows.

70 g to 100 g of a polycarbonate polyol composition was weighed into a 300 cc eggplant-shaped flask, and the polycarbonate polyol composition was heated in a heating bath of approximately 180° C. with stirring at a pressure of 0.1 kPa or lower using a rotary evaporator connected to a trap bulb for fraction recovery, to obtain a fraction corresponding to approximately 1 to 2% by mass of the polycarbonate polyol composition, i.e., approximately 1 g (0.7 to 2 g) of the fraction, in the trap bulb. This fraction was recovered with approximately 100 g (95 to 105 g) of ethanol (alternatively, a solvent such as tetrahydrofuran, acetone, or methanol may also be used) as a solvent, and the recovered solution was subjected to GC analysis. The proportion of terminal hydroxy groups was calculated from the values of peak areas of the resulting chromatogram according to the following expression.

Ratio of terminal hydroxy groups (% by mol)=(Sum of the peak areas of polyols having terminal hydroxy groups)/(Sum of the peak areas of alcohols (excluding ethanol if ethanol was used as a solvent) including polyols)×100.

The conditions of GC analysis are as follows.

Conditions of gas chromatography analysis: column; DB-WAX (manufactured by J&W Scientific Inc., US), 30 m, film thickness of 0.25 μm, temperature rise conditions: 60° C. to 250° C., detector: FID (flame ionization detector).

[Structure]

A polycarbonate polyol composition obtained in each of Examples and Comparative Examples mentioned later was used as a sample, and each structure (cyclic structure and hydrophilic structure) was confirmed by the following method.

<Cyclic Structure>

The cyclic structure was confirmed by the following method 1) and/or 2).

1) The sample was subjected to mass spectrometry, FT-IR measurement, $^1$H-NMR measurement and/or $^{13}$C-NMR, and the cyclic structure was confirmed by identification from each spectrum thus obtained. The analysis method and the identification were performed with reference to a method known in the art and/or Spectrometric Identification of Organic Compounds (7th ed) (Tokyo Kagaku Dojin).

2) As for an isocyanurate group, a uretdione group, and an iminooxadiazinedione group, the cyclic structure was confirmed by the method described in Japanese Patent Laid-Open No. 2016-53127.

<Hydrophilic Structure>

The method of <Water dispersibility> mentioned later was carried out to confirm whether the sample was dispersible in water. When the evaluation results were ○ or Δ, the sample was confirmed to have a hydrophilic structure. The hydrophilic structure was determined by the following method 1), 2) and/or 3).

1) The hydrophilic structure was determined from the structure of each starting material used.

2) The sample was subjected to mass spectrometry, FT-IR measurement, $^1$H-NMR measurement and/or $^{13}$C-NMR, and the hydrophilic structure was confirmed by identification from each spectrum thus obtained.

The analysis method and the identification were performed with reference to a method known in the art and/or Spectrometric Identification of Organic Compounds (7th ed) (Tokyo Kagaku Dojin).

3) The hydrophilic structure was determined by pyrolysis GC/MS and/or derivatization GC/MS. Specific examples of the analysis method include, but are not particularly limited to, the following methods of <Pyrolysis GC/MS> and <Derivatization GC/MS>.

<Pyrolysis GC/MS>

Apparatus: Agilent Technology 6890GC/5973MSD
Column: HP-5MS (L: 30 m, I.D.: 0.25 mm, Film thickness: 0.25 μm)
Carrier: Helium
Ionization method: EI
Mass range: m/z 10-800
Oven temperature: 40° C. (5 min hold)→(10° C./min)→320° C. (16 min hold)
Injection port temperature: 320° C.
Transfer temperature: 320° C.
Split ratio: Split 1/50
Amount of sample: 0.1 mg
Pyrolysis temperature: 600° C.
Interface temperature: 320° C.

<Derivatization GC/MS>

Apparatus: Agilent Technology 7890GC/5977MSD
Column: HP-5MS (L: 30 m, I.D.: 0.25 mm, Film thickness: 0.25 μm)
Carrier: Helium
Ionization method: EI
Mass range: m/z 10-800

Oven temperature: 40° C. (5 min hold)→(20° C./min) →320° C. (21 min hold)

Injection port temperature: 320° C.

Transfer temperature: 320° C.

Split ratio: Split 1/10

Injection volume: 2 μL

Derivatizing agent: BSA (N.O-bis(trimethylsilyl)acetamide)

[Water Dispersibility]

Steps 1 to 2 described in (Preparation method) of <Method for preparing polyurethane coating film> mentioned later were carried out, and the obtained aqueous dispersion was left standing at 23° C. and evaluated according to the following criteria.

[Evaluation Criteria]

○: Dispersed in water for 7 days or longer without precipitates

Δ: Dispersed in water for 1 day or longer and shorter than 7 days without precipitates X: Not dispersed in water (precipitates were present) or dispersed in water for less than 1 day

[Dipropylene Glycol Monomethyl Ether Compatibility]

A polycarbonate polyol composition obtained in each of Examples and Comparative Examples mentioned later was used as a sample, and its compatibility was determined in accordance with the procedures of the following steps 1 to 3.

Step 1: A base agent and DPM were weighed into a plastic container such that the solid content of the base agent was 80%. The obtained solution was stirred using a stirrer.

Step 2: The contents were transferred from the plastic container to a clear colorless glass bottle and left standing at 23° C. for 24 hours or longer.

Step 3: The contents in the clear colorless glass bottle were confirmed and evaluated according to the following criteria.

[Evaluation Criteria]

○: Uniformly dissolved

Δ: Dissolved, but clouded

X: White turbid or separated into two layers

<Method for Preparing Polyurethane Coating Film>

[Coating Material Composition]

The starting materials (base agent, curing agent, catalyst, solvent, hydrophilic solvent, leveling agent, flatting agent and antisettling agent) used were weighed into a plastic container according to the coating material blending conditions given below, and stirred until uniformly dispersed using a stirrer to obtain a coating material composition. However, other hydrophilic solvents may be used instead of the hydrophilic solvent used, when the base agent is not compatible with dipropylene glycol monomethyl ether.

(Starting Material Used)

Base agent: Polycarbonate polyol composition obtained in each of Examples and Comparative Examples Curing agent: WT36-72PB (manufactured by Asahi Kasei Corp., NCO %=14.3, solid content: 72%)

Catalyst: Borchers LH10 (manufactured by OMG Borchers GmbH, 1% aqueous catalyst)

Solvent: Pure water

Hydrophilic solvent: DPM

Leveling agent: BYK-331 (manufactured by BYK Additives & Instruments)

Flatting agent: ACEMATT TS 100 (manufactured by Evonik Industries AG)

Antisettling agent: Disparlon AQ-002 (manufactured by Kusumoto Chemicals, Ltd.)

(Blending Conditions)

NCO/OH: 1.25

Coating material solid content: 40%

Catalyst: 30% based on the total amount of the base agent and the curing agent

Leveling agent: 0.3% based on the total amount of the base agent and the curing agent Flatting agent: 10% based on the total amount of the base agent and the curing agent Antisettling agent: 0.6% based on the total amount of the base agent and the curing agent (Preparation Method)

A coating material composition was prepared in accordance with the procedures of the following steps 1 to 4.

Step 1: A base agent and a hydrophilic solvent were weighed into a plastic container such that the solid content of the base agent was 80%. The obtained solution was stirred until uniformly dissolved using a stirrer.

Step 2: A solvent was weighed into the plastic container such that the solid content of the coating material composition was 40%. The obtained solution was stirred until evenly dispersed using a stirrer to obtain an aqueous dispersion.

Step 3: A catalyst, a leveling agent, a flatting agent and an antisettling agent were weighed into the plastic container so as to attain the blending conditions mentioned above. The obtained solution was stirred until evenly dispersed using a stirrer.

Step 4: A curing agent was weighed into the plastic container so as to attain NCO/OH=1.25. The obtained solution was stirred until evenly dispersed using a stirrer to obtain a coating material composition.

[Application Step]

Each coating material composition obtained was used, and applied onto a polycarbonate plate ("Takiron PC-1600" (trade name), 2 mm×70 mm×150 mm) such that the dry film thickness was a thickness of 40 μm.

[Drying Step]

The coating material composition applied onto the polycarbonate plate was baked at 60° C. and thereby dried until any finger mark was no longer left on the surface, to obtain a polyurethane coating film. The obtained polyurethane coating film was evaluated for various physical properties by methods mentioned later. The evaluation results are shown in Table 2.

[Drying Property Evaluation]

In the above-described method for producing a polyurethane coating film, the baking time (drying time) until any finger mark was no longer left on the surface was measured after the application step.

[Coating Film Appearance]

After baking until any finger mark was no longer left by the drying property evaluation, the appearance of the obtained coating film was visually observed. A method for determining the coating film appearance was as follows.

[Determination Method]

○: Smooth without cracks or grains

Δ: Not cracked, though grains were present

X: Cracked

[Chemical Resistance Test (Sunscreen Resistance Test)]

Sunscreen resistance was evaluated as chemical resistance using a commercially available sunscreen cream.

After baking until any finger mark was no longer left by the drying property evaluation, the obtained coating film was cured at 23° C. in a 50% RH atmosphere for 1 day. Onto the coating film thus cured, a sunscreen agent (Neutrogena Ultra Sheer DRY-TOUCH SUNSCREEN Broad Spectrum SPF 45) was applied so as to attain 2 g/4 $cm^2$ on the coating film surface, followed by heating at 55° C. for 4 hours. Then, the surface of the coating film was thoroughly washed with a small amount of a neutral detergent to remove the sunscreen agent. The coating film was dried at 23° C. in a 50% RH atmosphere on a horizontal table. Then, the absence of remnants of the sunscreen agent or abnormalities such as swelling or peeling of the coating film was visually observed. The chemical resistance (sunscreen resistance) was evaluated according to the criteria given below. The chemical resistance is an index for endurance.

[Evaluation Criteria]

○: The appearance of the coating film was not changed.

Δ: The appearance of the coating film was slightly changed.

X: The appearance of the coating film was changed to have swelling and/or remnants.

[Weather Resistance]

After baking until any finger mark was no longer left by the finger touch evaluation, the obtained coating film was cured at 23° C. in a 50% RH atmosphere for 1 day. The coating film thus cured was subjected to a weather resistance test for 500 hours using DPWL-5R manufactured by Suga Test Instruments Co., Ltd. (black panel temperature: 60° C., irradiance: 30 w/$m^2$, cycle conditions: irradiation at 60° C. for 4 hours and wetting at 40° C. for 4 hours, ultraviolet fluorescent lamp: SUGA-FS-40). The coating film thus tested was observed in accordance with the pencil hardness method of JIS K5600-5-6: 1999 for the presence or absence of a pencil scratch mark remaining on the coating film using a 6B pencil. The weather resistance was evaluated according to the criteria given below. The weather resistance was an index for endurance.

(Evaluation Criteria)

◎: No scratch mark was observed.

○: A faint scratch mark was left, but disappeared by tracing with a finger.

Δ: A faint scratch mark was observed and did not disappear by tracing with a finger.

X: A clear scratch mark was observed, or peeling of the coating film was observed.

[Taber Abrasion Test]

The coating material composition mentioned above was used, and applied onto a PVC sheet for use as an interior material for a vehicle such that the dry film thickness was a thickness of 10 μm. The coating film was baked at 60° C. for 60 minutes, then cured at 23° C. in a 50% RH atmosphere for 1 day, and tested according to the testing conditions described below to measure decrease in weight (mg). Decrease in weight closer to 0 mg means better Taber abrasion test results. The Taber abrasion test results are an index for endurance.

(Testing Conditions)

In accordance with JIS K7204

Abrasion wheel: H22

Load: 500 g

The number of rotations: 200

<Method for Preparing Polyurethane Film>

In a 500 ml separable flask in which a thermocouple and a condenser were installed, the following method was carried out such that the finished amount was 300 g.

A polycarbonate polyol composition obtained in each of Examples and Comparative Examples was added into dimethylformamide (hereinafter, also abbreviated to DMF) such that the final solid content was 20%. Further, a 1% solution of dibutyltin dilaurate in toluene was placed at 50 ppm based on the total mass of MDI and the polycarbonate polyol composition in the flask, which was then warmed in an oil bath of 40° C. While the solution in the flask was stirred at 100 rpm in a nitrogen atmosphere in the flask, MDI was added dropwise thereto at 3.09 times (mol) based on OH (mol) of the polycarbonate polyol composition. The solution in the flask was further stirred for approximately 1.5 hours. The consumption of a theoretical amount was confirmed by the analysis of an isocyanate group concentration to obtain a prepolymer. Subsequently, a necessary amount of 1,4-butanediol calculated from residual isocyanate was added in divided portions into the flask. The solution in the flask was stirred for approximately 1 hour. Then, approximately 1 g of ethanol was added thereto, and the solution in the flask was further stirred for 30 minutes to obtain a polyurethane solution.

The obtained polyurethane solution was added dropwise to the upper part of a glass plate (JIS R3202, 2 mm×100 mm×150 mm), which was then coated using a 0.8 mm thick applicator such that the dry film thickness was 50 to 150 μm. The coating film was dried for 2 hours on a hot plate having a surface temperature of 60° C. and subsequently for 12 hours in an oven of 80° C. The coating film was further left standing under constant temperature and humidity conditions of 23° C. and 55% RH for 12 hours or longer to obtain a polyurethane film. The obtained polyurethane film was evaluated for various physical properties by methods mentioned later. The evaluation results are shown in Table 3.

<Method for Preparing Aqueous Polyurethane Film (Polyurethane Dispersion Film)>

(Starting Material Used)

Polycarbonate polyol composition (hereinafter, also abbreviated to "Polyol") obtained in each of Examples and Comparative Examples DMPA (2,2-dimethylolpropionic acid)

Methyl ethyl ketone (MEK)

Dibutyltin dilaurate (DBTDL)

IPDI (isophorone diisocyanate)

Triethylamine (TEA)

Pure water

Ethylenediamine (EDA)

(Amount Added)

Polyol, IPDI, DMPA, TEA, and EDA were added so as to attain a molar ratio of Polyol/IPDI/DMPA/TEA/EDA=1.00/2.63/0.63/0.63.

DBTDL was added at 100 ppm based on the total amount of Polyol, IPDI, and DMPA. If necessary, DBTDL can be diluted with toluene for addition (e.g., a 5% solution of DBTDL in toluene).

MEK was added such that the solid content in a prepolymer step was 65%.

Pure water was added such that the final solid content after a MEK distillation off step was 30%. However, the solid content may be appropriately adjusted by the addition of pure water if viscosity is high in a chain extension step.

(Prepolymer Step)

The internal atmosphere of a 1 L separable flask to which a stirrer, a thermometer, a reflux condenser, a nitrogen blowing tube, and a dropping funnel were attached was purged with nitrogen. Polyol, DMPA, DBTDL, and MEK were added to the flask and stirred at 200 rpm for 15 minutes under reflux at 80° C. Subsequently, IPDI was added thereto with a syringe, and the mixture was stirred under reflux at 80° C. until NCO % reached 3.5±0.3% by mass to obtain a solution of a terminal isocyanate group-containing urethane prepolymer in MEK. The NCO % is the ratio of the mass of an isocyanate group in polyisocyanate to the total mass of the starting materials used in the prepolymer step.

(Neutralization Step and Emulsification Step)

The obtained urethane prepolymer solution was cooled to 35° C., and TEA was added thereto with stirring at 500 rpm. Subsequently, while the solution was kept at 35° C. and the stirring at 500 rpm was continued, pure water was added dropwise thereto at a rate of 10 mL/min to obtain an emulsion (emulsified liquid).

(Chain Extension Step)

While the obtained emulsion was kept at 35° C. and the stirring at 500 rpm was continued, EDA was added thereto for chain extension reaction.

(MEK Distillation Off Step)

Methyl ethyl ketone was distilled off under reduced pressure by the heating of the solution after the chain extension reaction to obtain an aqueous polyurethane solution.

(Film Preparation Step)

The obtained aqueous polyurethane solution was applied to a polypropylene plate (JIS K 6921) to which a frame was attached such that the dry film thickness was 300 μm. The coating film was left standing at 23° C. in a 50% RH atmosphere for 1 day, then baked at 80° C. for 3 hours, and cured at 23° C. in a 50% RH atmosphere for 1 week to obtain an aqueous polyurethane film. The obtained aqueous polyurethane film was evaluated for various physical properties by methods mentioned later. The evaluation results are shown in Table 4.

[Chemical Resistance Test (Oleic Acid Resistance Test)]

Oleic acid resistance was evaluated as chemical resistance using oleic acid.

A 1 cm×10 cm reed-shaped test specimen was cut out of the polyurethane film. The mass of the test specimen was measured with a precision balance. Then, the test specimen was added to a 250 mL glass tray containing 50 mL of oleic acid as a test solvent, and left standing for 24 hours in a thermostat bath of 80° C. having a nitrogen atmosphere. The test specimen thus tested was taken out thereof, and the front and back were lightly wiped with a paper wiper. Then, the mass was measured with a precision balance, and the rate of change in mass (rate of increase in mass (rate of swelling (%)) from that before the test was calculated. A rate of change in mass closer to 0% means better oleic acid resistance. The chemical resistance is an index for endurance.

[Chemical Resistance Test (Solvent Resistance Test)]

Solvent resistance was tested as chemical resistance using ethanol (EtOH) and xylene.

The aqueous polyurethane film was cut, and the cut piece was attached onto a glass plate (JIS R3202, 2 mm×100 mm×150 mm). A cotton ball impregnated with the solvent (ethanol or xylene) was left standing on the coating film surface on a horizontal table at 23° C. in a 50% RH atmosphere. The time to cause abnormalities such as scratches or whitening was visually evaluated. However, a time of shorter than 10 seconds was described as "<10 sec" in view of the reproducibility of the evaluation.

[Evaluation of Moist Heat Resistance]

A 1 cm×10 cm reed-shaped sample was prepared from the polyurethane film or the aqueous polyurethane film. The prepared sample was heated under conditions involving a temperature of 85° C. and a humidity of 85% for 10 days in a thermo-hygrostat manufactured by ESPEC Corp. under product name of "PL-1J". The sample thus heated was subjected to a tensile test using a tensile tester (manufactured by Orientec Co., Ltd., product name "Tensilon, model RTE-1210") under conditions involving a distance of 20 mm between chucks, a pulling rate of 100 mm/min, and a temperature of 23° C. (relative humidity: 55%). Breaking strength was measured, and the rate of retention (%) thereof was determined. A higher rate of retention was evaluated as better moist heat resistance. The moist heat resistance is an index for endurance.

Rate of retention (%)=(Breaking strength after heating/Breaking strength before heating)×100

Comparative Example 1

A 2 L glass flask (hereinafter, also referred to as a "reactor") equipped with a rectifying column packed with a regular packing material, and a stirring apparatus was charged with 458 g of 1,5-pentanediol, 500 g of 1,6-hexanediol, and 760 g of ethylene carbonate. Then, 0.086 g of titanium tetra-n-butoxide was placed therein as a catalyst. While a portion of the distillate was extracted, the mixture was reacted at a reaction temperature of 160 to 175° C. for 12 hours. Subsequently, the reactor was connected directly to a condenser. The reaction temperature was raised to 175 to 190° C. Then, the pressure was gradually lowered. While the hydroxy value of the formed polycarbonate polyol was measuring by appropriate sampling, the diol component in the reactor was distilled off to obtain a polycarbonate polyol (860 g) having a hydroxy value of 109.8 mg-KOH/g. To the obtained polycarbonate polyol (860 g), 96 g of polyoxyethylene diol (manufactured by FUJIFILM Wako Pure Chemical Corp., "Polyethylene Glycol 1000" (trade name)) was added as a starting material forming a nonionic hydrophilic group, and the mixture was stirred at 150° C. for 6 hours. Then, the reaction temperature was lowered to 115° C. 0.056 g of 85% phosphoric acid was added thereto, and the mixture was stirred at 115° C. for 3 hours to obtain polycarbonate polyol composition HP-1 having a hydroxy value of 110.8 mg-KOH/g. The evaluation results are shown in Table 1.

Comparative Example 2

A 1 L glass flask (hereinafter, also referred to as a "reactor") equipped with a rectifying column packed with a regular packing material, and a stirring apparatus was charged with 330 g of 1,4-butanediol, 130 g of 1,6-hexanediol, and 415 g of ethylene carbonate. Then, 0.093 g of titanium tetra-n-butoxide was placed therein as a catalyst. While a portion of the distillate was extracted, the mixture was reacted at a reaction temperature of 155 to 165° C. for 18 hours. Subsequently, the reactor was connected directly to a condenser. The reaction temperature was raised to 165 to 180° C. Then, the pressure was gradually lowered. While the hydroxy value of the formed polycarbonate polyol was measuring by appropriate sampling, the diol component in the reactor was distilled off to obtain a polycarbonate polyol (326 g) having a hydroxy value of 109.5 mg-KOH/g. To the obtained polycarbonate polyol (326 g), 36 g of polyoxyethylene diol (manufactured by FUJIFILM Wako Pure Chemical Corp., "Polyethylene Glycol 1000" (trade name)) was added as a starting material forming a nonionic hydrophilic group, and the mixture was stirred at 150° C. for 6 hours. Then, the reaction temperature was lowered to 115° C. 0.115 g of dibutyl phosphate was added thereto, and the mixture was stirred at 115° C. for 3 hours to obtain polycarbonate polyol composition HP-2 having a hydroxy value of 110.0 mg-KOH/g. The evaluation results are shown in Table 1.

Comparative Example 3

A 1 L glass flask (hereinafter, also referred to as a "reactor") equipped with a rectifying column packed with a regular packing material, and a stirring apparatus was charged with 234 g of 1,4-butanediol, 236 g of 1,6-hexanediol, and 396 g of ethylene carbonate. Then, 0.086 g of titanium tetra-n-butoxide was placed therein as a catalyst. While a portion of the distillate was extracted, the mixture was reacted at a reaction temperature of 150 to 165° C. for 20 hours. Subsequently, the reactor was connected directly to a condenser. The reaction temperature was raised to 170 to 180° C. Then, the pressure was gradually lowered. While the hydroxy value of the formed polycarbonate polyol was measuring by appropriate sampling, the diol component in the reactor was distilled off to obtain a polycarbonate polyol (362 g) having a hydroxy value of 56.0 mg-KOH/g. To the obtained polycarbonate polyol (362 g), 40 g of polyoxyethylene diol (manufactured by FUJIFILM Wako Pure Chemical Corp., "Polyethylene Glycol 1000" (trade name)) was added as a starting material forming a nonionic hydrophilic group, and the mixture was stirred at 150° C. for 6 hours. Then, the reaction temperature was lowered to 115° C. 0.080 g of dibutyl phosphate was added thereto, and the mixture was stirred at 115° C. for 3 hours to obtain polycarbonate polyol composition HP-3 having a hydroxy value of 61.1 mg-KOH/g. The evaluation results are shown in Table 1.

Example 1

A 0.3 L glass flask (reactor) equipped with a stirring apparatus was charged with the polycarbonate polyol composition HP-1 obtained in Comparative Example 1, and TLA-100 (manufactured by Asahi Kasei Corp., NCO %=23.3, solid content: 100%, a water-insoluble isocyanate polymer having an isocyanurate ring as a starting material forming a cyclic structure) as an isocyanate compound such that NCO/OH was 0.10 and the amount of the starting materials added was 100 g. Subsequently, the mixture was heated with stirring and reacted at an internal temperature of approximately 120° C. in the reactor until a NCO group disappeared to obtain polycarbonate polyol composition JP-1. The evaluation results are shown in Table 1. The progression of the reaction was confirmed from the disappearance of an infrared absorption spectrum absorbance (Abs) peak around a wavenumber of 2271 $cm^{-1}$ derived from a NCO group by the FT-IR measurement mentioned above of the reaction solution.

Example 2

Polycarbonate polyol composition JP-2 was obtained by use of the same method as in Example 1 except that NCO/OH was 0.15. The evaluation results are shown in Table 1.

Example 3

Polycarbonate polyol composition JP-3 was obtained by use of the same method as in Example 1 except that NCO/OH was 0.20. The evaluation results are shown in Table 1.

Example 4

Polycarbonate polyol composition JP-4 was obtained by use of the same method as in Example 3 except that HP-2 was used as the polycarbonate polyol composition instead of HP-1. The evaluation results are shown in Table 1.

Example 5

Polycarbonate polyol composition JP-5 was obtained by use of the same method as in Example 1 except that the polycarbonate polyol composition HP-3 obtained in Comparative Example 3 was used as the polycarbonate polyol composition instead of HP-1. The evaluation results are shown in Table 1.

Example 6

Polycarbonate polyol composition JP-6 was obtained by use of the same method as in Example 3 except that the polycarbonate polyol composition HP-3 obtained in Comparative Example 3 was used as the polycarbonate polyol composition instead of HP-1. The evaluation results are shown in Table 1.

Example 7

Polycarbonate polyol composition JP-7 was obtained by use of the same method as in Example 3 except that Bayhydur XP2655 (manufactured by Sumika Covestro Urethane Co., Ltd., NCO %=20.8, solid content: 100%, an anionic water-soluble isocyanate polymer having an isocyanurate ring as a starting material forming a cyclic structure, and a sulfone group as a starting material forming a hydrophilic group) was used as the isocyanate compound instead of TLA-100. The evaluation results are shown in Table 1.

Comparative Example 4

Polycarbonate polyol composition HP-4 was obtained by use of the same method as in Example 1 except that NCO/OH was 0.55. The evaluation results are shown in Table 1.

TABLE 1

| | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|
| Base agent | HP-1 | HP-1 | HP-1 | HP-2 | HP-3 | HP-3 | HP-1 | HP-1 | HP-2 | HP-3 | HP-1 |
| Modifying agent | TLA-100 | TLA-100 | TLA-100 | TLA-100 | TLA-100 | TLA-100 | XP2655 | — | — | — | TLA-100 |
| Presence or absence of unmodified polycarbonate polyol | Present | Present | Present | Present | Present | Present | Present | Present | Present | Present | Absent |

TABLE 1-continued

| | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|
| Presence or absence of modified polycarbonate polyol | Present | Present | Present | Present | Present | Present | Present | Absent | Absent | Absent | Present |
| OHV | 94.5 | 90.4 | 83.4 | 83.0 | 52.0 | 46.3 | 83.9 | 110.8 | 110.0 | 61.1 | 54.4 |
| APHA | 15 | 10 | 20 | 15 | 10 | 10 | 10 | 10 | 10 | 10 | 30 |
| Mn | 1603 | 1756 | 1925 | 1927 | 3073 | 3779 | 1939 | 1084 | 1112 | 1901 | 3847 |
| Mw/Mn | 2.55 | 2.87 | 3.07 | 3.28 | 3.26 | 3.78 | 3.22 | 2.08 | 2.23 | 2.49 | 7.12 |
| The number of functional groups | 2.70 | 2.83 | 2.86 | 2.85 | 2.85 | 3.12 | 2.90 | 2.14 | 2.18 | 2.07 | 3.73 |
| PB/PA | 0.26 | 0.27 | 0.29 | 0.31 | 0.17 | 0.21 | 0.48 | 0.00 | 0.00 | 0.00 | 0.36 |
| PB/POH | 1.96 | 2.44 | 2.97 | 2.95 | 1.76 | 3.45 | 2.79 | 0.00 | 0.00 | 0.00 | 6.82 |
| Amount of hydroxy group in total quantity of terminal groups (% by mol) | 98.20 | 97.30 | 97.80 | 97.50 | 98.80 | 98.50 | 96.30 | 98.50 | 98.80 | 99.00 | 98.22 |
| Cyclic structure | Iso-cyanurate | Iso-cyanurate | Iso-cyanurate | Iso-cyanurate | Iso-cyanurate | Iso-cyanurate | Iso-cyanurate | — | — | — | Iso-cyanurate |
| Hydrophilic structure | Nonionic | Nonionic | Nonionic | Nonionic | Nonionic | Nonionic | Nonionic and anionic | Nonionic | Nonionic | Nonionic | Nonionic |
| DPM compatibility | ○ | ○ | ○ | ○ | ○ | Δ | ○ | ○ | ○ | ○ | x |
| Water dispersibility | ○ | ○ | ○ | ○ | ○ | Δ | ○ | ○ | ○ | ○ | x |

Application Examples 1 to 7 and Application Comparative Examples 1 to 3

Polyurethane coating films were prepared by the method mentioned above using the polycarbonate polyol compositions JP-1 to JP-7 obtained in Examples 1 to 7, and the polycarbonate polyol compositions HP-1 to HP-3 obtained in Comparative Examples 1 to 3. The obtained coating films were evaluated. The evaluation results are shown in Table 2.

TABLE 2

| | Application Example 1 | Application Example 2 | Application Example 3 | Application Example 4 | Application Example 5 | Application Example 6 | Application Example 7 | Application Comparative Example 1 | Application Comparative Example 2 | Application Comparative Example 3 |
|---|---|---|---|---|---|---|---|---|---|---|
| Base agent | JP-1 | JP-2 | J P-3 | JP-4 | J P-5 | JP-6 | J P-7 | HP-1 | HP-2 | HP-3 |
| Drying property | 45 min | 40 min | 30 min | 30 min | 45 min | 30 min | 30 min | 60 min | 60 min | 70 min |
| Coating film appearance | ○ | ○ | ○ | ○ | ○ | ○ | ○ | ○ | ○ | ○ |
| Sunscreen resistance | ○ | ◎ | ◎ | ◎ | ○ | ○ | ◎ | x | Δ | x |
| Weather resistance | ○ | ○ | ○ | ○ | ○ | ○ | ○ | ○ | ○ | ○ |
| Taber abrasion test (decrease in weight [mg]) | 75.3 | 70.7 | 65.5 | 60.6 | 78.1 | 68.3 | 62.1 | 94.2 | 90.1 | 91.1 |

Application Examples 8 to 10 and Application Comparative Example 4

Polyurethane films were prepared by the method mentioned above using the polycarbonate polyol compositions JP-3 to JP-5 obtained in Examples 3 to 5, and the polycarbonate polyol composition HP-1 obtained in Comparative Example 1. The obtained films were evaluated. The evaluation results are shown in Table 3.

TABLE 3

| | Application Example 8 | Application Example 9 | Application Example 10 | Application Comparative Example 4 |
|---|---|---|---|---|
| Base agent | JP-3 | JP-4 | JP-5 | HP-1 |
| Oleic acid resistance (rate of swelling) | 6.4% | 5.0% | 7.1% | 15.1% |
| Moist heat resistance (rate of retention) | 95.5% | 96.1% | 96.2% | 87.6% |

Application Examples 11 and 12 and Application Comparative Examples 5 and 6

Aqueous polyurethane films were prepared by the method mentioned above using the polycarbonate polyol compositions JP-3 and JP-4 obtained in Examples 3 and 4, and the polycarbonate polyol compositions HP-1 and HP-2 obtained in Comparative Examples 1 and 2. The obtained films were evaluated. The evaluation results are shown in Table 4.

TABLE 4

| | | Application Example 11 | Application Example 12 | Application Comparative Example 5 | Application Comparative Example 6 |
|---|---|---|---|---|---|
| Base agent | | JP-3 | JP-4 | HP-1 | HP-2 |
| Chemical resistance | EtOH | 30 sec | 30 sec | 10 sec | 15 sec |
| spot test | Xylene | 60 sec | 60 sec | 30 sec | 45 sec |
| Moist heat resistance (rate of retention) | | 66.4% | 63.5% | 6.3% | 5.2% |

As described above, the polycarbonate polyol compositions of the present Examples were confirmed to be excellent in compatibility with DPM and to be capable of forming a coating material composition excellent in drying properties and a coating film and/or a polyurethane film excellent in endurance.

The present application is based on Japanese Patent Application No. 2020-171511 filed in Oct. 9, 2020, the contents of which are incorporated herein by reference.

INDUSTRIAL APPLICABILITY

The polycarbonate polyol composition of the present invention can be suitably used in a wide range of fields such as coating materials for automobiles, buses, rail vehicles, building site equipment, agricultural machines, floors, walls or roofs of architectures, metal products, mortar or concrete products, wood products, plastic products, and ceramics construction materials such as calcium silicate boards or plaster boards, etc., and/or polyurethanes.

The invention claimed is:

1. A polycarbonate polyol composition comprising an unmodified polycarbonate polyol having a carbonate structure represented by the following formula (A), and a modified polycarbonate polyol having a carbonate structure represented by the following formula (A) and a urethane structure represented by the following formula (B), wherein 90% by mol or more of the total quantity of terminal groups of all the compounds in the composition is hydroxy groups, and the number of functional groups calculated according to the following expression (II) is 2.20 to 10.00; and wherein in infrared absorption spectrum absorbance measured by FT-IR, when a height of an infrared absorption spectrum absorbance (Abs) peak around a wavenumber of 1691 $cm^{-1}$ from the urethane structure represented by the formula (B) is defined as PB and when a height of an infrared absorption spectrum absorbance (Abs) peak around a wavenumber of 3000 to 3800 $cm^{-1}$ from a hydroxy group is defined as POH, a value of PB/POH is 1.00 to 3.50:

(A)

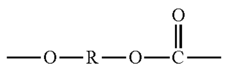

wherein R represents a divalent linear, branched or cyclic aliphatic hydrocarbon group optionally containing a heteroatom, or a divalent aromatic hydrocarbon group optionally containing a heteroatom, (B)

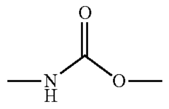

$$\text{the number of functional groups}=\text{Mn}\times\text{OHV}/56.11/1000 \quad \text{(II)}$$

wherein Mn represents a number-average molecular weight of the polycarbonate polyol composition determined by GPC measurement, and OHV represents a hydroxy value of the polycarbonate polyol composition, and wherein in infrared absorption spectrum absorbance measured by FT-IR, when a height of an infrared absorption spectrum absorbance (Abs) peak around a wavenumber of 1743 $cm^{-1}$ from the carbonate structure represented by the formula (A) is defined as PA and when a height of an infrared absorption spectrum absorbance (Abs) peak around a wavenumber of 1691 $cm^{-1}$ from the urethane structure represented by the formula (B) is defined as PB, a value of PB/PA is 0.05 to 1.00.

2. The polycarbonate polyol composition according to claim 1, wherein the hydroxy value is 5 to 700 mg-KOH/g.

3. The polycarbonate polyol composition according to claim 1, wherein APHA, measured in accordance with JIS K 0071-1, is 100 or less.

4. The polycarbonate polyol composition according to claim 1, wherein in infrared absorption spectrum absorbance measured by FT-IR, when a height of an infrared absorption spectrum absorbance (Abs) peak around a wavenumber of 1743 $cm^{-1}$ from the carbonate structure represented by the formula (A) is defined as PA and when a height of an infrared absorption spectrum absorbance (Abs) peak around a wavenumber of 1691 $cm^{-1}$ from the urethane structure represented by the formula (B) is defined as PB, a value of PB/PA is 0.05 to 1.00.

5. The polycarbonate polyol composition according to claim 1, wherein the modified polycarbonate polyol comprises a cyclic structure.

6. The polycarbonate polyol composition according to claim 5, wherein the cyclic structure is an isocyanurate ring.

7. The polycarbonate polyol composition according to claim 1, wherein the unmodified polycarbonate polyol and/or the modified polycarbonate polyol comprises a hydrophilic structure.

8. The polycarbonate polyol composition according to claim 7, wherein the hydrophilic structure is a nonionic hydrophilic group.

9. The polycarbonate polyol composition according to claim 7, wherein the hydrophilic structure is an anionic hydrophilic group.

10. The polycarbonate polyol composition according to claim 7, wherein the composition is capable of being dispersed in water.

11. A coating material comprising the polycarbonate polyol composition according to claim 1.

12. A coating agent comprising the polycarbonate polyol composition according to claim 1.

13. A polyurethane obtained using the polycarbonate polyol composition according to claim 1.

14. An artificial leather obtained using the polyurethane according to claim 13.

15. A synthetic leather obtained using the polyurethane according to claim 13.

16. A coating material obtained using the polyurethane according to claim 13.

17. A coating agent obtained using the polyurethane according to claim 13.

18. An aqueous polyurethane obtained using the polycarbonate polyol composition according to claim 1.

* * * * *